United States Patent [19]
Halstead, Jr. et al.

[11] Patent Number: 5,946,648
[45] Date of Patent: Aug. 31, 1999

[54] IDENTIFICATION OF WORDS IN JAPANESE TEXT BY A COMPUTER SYSTEM

[75] Inventors: Patrick H. Halstead, Jr., Bellevue; Hisami Suzuki, Redmond, both of Wash.

[73] Assignee: Microsoft Corporation, Redmond, Wash.

[21] Appl. No.: 09/121,655

[22] Filed: Jul. 24, 1998

Related U.S. Application Data

[62] Division of application No. 08/672,638, Jun. 28, 1996.
[51] Int. Cl.$^6$ .................................................. G06F 17/27
[52] U.S. Cl. .................................................. 704/9; 707/531
[58] Field of Search .................................. 704/9, 1, 2, 10, 704/8; 707/5, 530, 531, 532, 533, 536

[56] References Cited

U.S. PATENT DOCUMENTS

| | | | |
|---|---|---|---|
| 5,268,840 | 12/1993 | Chang et al. | 704/9 |
| 5,490,061 | 2/1996 | Tolin et al. | 704/2 |
| 5,497,319 | 3/1996 | Chong et al. | 704/2 |
| 5,535,121 | 7/1996 | Roche et al. | 704/9 |
| 5,590,257 | 12/1996 | Forcier | 707/530 |
| 5,778,361 | 7/1998 | Nanjo et al. | 707/5 |
| 5,794,177 | 8/1998 | Carus et al. | 704/9 |
| 5,799,269 | 8/1998 | Schabes et al. | 704/9 |

FOREIGN PATENT DOCUMENTS 0 547 222 A1  6/1993  European Pat. Off. .

OTHER PUBLICATIONS

Abe, Masahori et al., "A Kana–Kanji Translation System for Non–Segmented Input Sentences Based on Syntactic and Semantic Analysis," *Zeitschrift fuer Werkstofftechnik—Journal of Materials Technology*, Aug. 25, 1986, pp. 280–285.

Hisamitsu, Toru et al., "An Efficient Treatment of Japanese Verb Inflection for Morphological Analysis," *Coling 1994 Proceedings*, 1:194–200.

Itoh Yoshiharu et al., "Sub–Phonemic Optimal Path Search for Concatenative Speech Synthesis," in $4^{th}$ European Conference on Speech Communication and Technology, Madrid, Sep., 1995, pp. 577–580.

Itoh, Nobuyashu, "Japanese Language Model Based on Bigrams and its Application to On–Line Character Recognition, " *Pattern Recognition*, 28(2):135–140, 1995.

Kurohashi et al., "Improvement of Japanese Morphological Analyzer Juman," Proceedings of SNLR, 1994, pp. 22–28.

Takeda, Koichi et al., "CRITAC—An Experimental System for Japanese Text Proofreading," *IBM Journal of Research and Development*, 32(2):201–216.

Teller, Virginia et al., "A Probabilistic Algorithm for Segmenting Non–Kanji Japanese Strings," in Jul. 12–16, 1992—Proceedings Tenth National Conference on Artificial Intelligence, vol. 1, Jul. 31, 1994, pp. 742–747.

*Primary Examiner*—Joseph Thomas
*Attorney, Agent, or Firm*—Seed and Berry LLP

[57] ABSTRACT

A word breaking facility operates to identify words within a Japanese text string. The word breaking facility performs morphological processing to identify postfix bound morphemes and prefix bound morphemes. The word breaking facility also performs opheme matching to identify likely stem characters. A scoring heuristic is applied to determine an optimal analysis that includes a postfix analysis, a stem analysis, and a prefix analysis. The morphological analyses are stored in an efficient compressed format to minimize the amount of memory they occupy and maximize the analysis speed. The morphological analyses of postfixes, stems, and prefixes is performed in a right-to-left fashion. The word breaking facility may be used in applications that demand identity of selection granularity, autosummarization applications, content indexing applications, and natural language processing applications.

16 Claims, 24 Drawing Sheets

五木寛之は「推理小説/\誤さえ/書こうと/していゐ」、「という|噂だ|。

$\underbrace{\qquad\qquad\qquad}_{55}$

*Fig. 6*

Morpheme: INFL_vADJ_kattari.
Analysis:
ADJsi << しかったり, ..
ADJ << かったり, ..
NAI << かったり, ..

Next States:

RNONE
INFL_verb_1nai:SURU
INFL_verb_1naide:SURU
INFL_verb_1pass:SURU
INFL_verb_1zu:SURU
INFL_verb_1zusite:SURU
INFL_verb_1neba:SURU
INFL_verb_2_mai:SURU
INFL_verb_2te:SURU
INFL_verb_3:SURU
INFL_verb_4:SURU
INFL_verb_5:SURU
INFL_verb_6:SURU

| Depth of Analysis (# of morphemes) | # of characters | | | | | | | | | | | | | | | | | | | | |
|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 |
| 1 | 1 | | | | | | | | | | | | | | | | | | | | |
| 2 | 1 | 2 | 4 | 7 | 11 | 16 | 22 | 29 | 37 | 46 | 56 | 67 | 79 | 92 | 106 | 121 | 137 | 154 | 172 | 191 | 211 |
| 3 | 1 | 1 | 3 | 6 | 10 | 15 | 21 | 28 | 36 | 45 | 55 | 66 | 78 | 91 | 105 | 120 | 136 | 153 | 171 | 190 | 210 |
| 4 | 1 | 1 | 2 | 5 | 9 | 14 | 20 | 27 | 35 | 44 | 54 | 65 | 77 | 90 | 104 | 119 | 135 | 152 | 170 | 189 | 209 |
| 5 | 1 | 1 | 2 | 4 | 8 | 13 | 19 | 26 | 34 | 43 | 53 | 64 | 76 | 89 | 103 | 118 | 134 | 151 | 169 | 188 | 208 |
| 6 | 1 | 1 | 2 | 4 | 7 | 12 | 18 | 25 | 33 | 42 | 52 | 63 | 75 | 88 | 102 | 117 | 133 | 150 | 168 | 187 | 207 |
| 7 | 1 | 1 | 2 | 4 | 7 | 11 | 17 | 24 | 32 | 41 | 51 | 62 | 74 | 87 | 101 | 116 | 132 | 149 | 167 | 186 | 206 |
| 8 | 1 | 1 | 2 | 4 | 7 | 11 | 16 | 23 | 31 | 40 | 50 | 61 | 73 | 86 | 100 | 115 | 131 | 148 | 166 | 185 | 205 |
| 9 | 1 | 1 | 2 | 4 | 7 | 11 | 16 | 22 | 30 | 39 | 49 | 60 | 72 | 85 | 99 | 114 | 130 | 147 | 165 | 184 | 204 |
| 10 | 1 | 1 | 2 | 4 | 7 | 11 | 16 | 22 | 29 | 38 | 48 | 59 | 71 | 84 | 98 | 113 | 129 | 146 | 164 | 183 | 203 |
| 11 | 1 | 1 | 2 | 4 | 7 | 11 | 16 | 22 | 29 | 37 | 47 | 58 | 70 | 83 | 97 | 112 | 128 | 145 | 163 | 182 | 202 |
| 12 | 1 | 1 | 2 | 4 | 7 | 11 | 16 | 22 | 29 | 37 | 46 | 57 | 69 | 82 | 96 | 111 | 127 | 144 | 162 | 181 | 201 |
| 13 | 1 | 1 | 2 | 4 | 7 | 11 | 16 | 22 | 29 | 37 | 46 | 56 | 68 | 81 | 95 | 110 | 126 | 143 | 161 | 180 | 200 |
| 14 | 1 | 1 | 2 | 4 | 7 | 11 | 16 | 22 | 29 | 37 | 46 | 56 | 67 | 80 | 94 | 109 | 125 | 142 | 160 | 179 | 199 |
| 15 | 1 | 1 | 2 | 4 | 7 | 11 | 16 | 22 | 29 | 37 | 46 | 56 | 67 | 79 | 93 | 108 | 124 | 141 | 159 | 178 | 198 |
| 16 | 1 | 1 | 2 | 4 | 7 | 11 | 16 | 22 | 29 | 37 | 46 | 56 | 67 | 79 | 92 | 107 | 123 | 140 | 158 | 177 | 197 |
| 17 | 1 | 1 | 2 | 4 | 7 | 11 | 16 | 22 | 29 | 37 | 46 | 56 | 67 | 79 | 92 | 106 | 122 | 139 | 157 | 176 | 196 |
| 18 | 1 | 1 | 2 | 4 | 7 | 11 | 16 | 22 | 29 | 37 | 46 | 56 | 67 | 79 | 92 | 106 | 121 | 138 | 156 | 175 | 195 |
| 19 | 1 | 1 | 2 | 4 | 7 | 11 | 16 | 22 | 29 | 37 | 46 | 56 | 67 | 79 | 92 | 106 | 121 | 137 | 155 | 174 | 194 |
| 20 | 1 | 1 | 2 | 4 | 7 | 11 | 16 | 22 | 29 | 37 | 46 | 56 | 67 | 79 | 92 | 106 | 121 | 137 | 154 | 173 | 193 |
| 21 | 1 | 1 | 2 | 4 | 7 | 11 | 16 | 22 | 29 | 37 | 46 | 56 | 67 | 79 | 92 | 106 | 121 | 137 | 154 | 172 | 192 |

IDENTIFICATION OF WORDS IN JAPANESE TEXT BY A COMPUTER SYSTEM

CROSS-REFERENCE TO RELATED APPLICATION

This application is a divisional application of U.S. patent application Ser. No. 08/672,638, filed Jun. 28, 1996.

TECHNICAL FIELD

The present invention relates generally to data processing systems and more particularly to identification of words in Japanese text by a computer system.

BACKGROUND OF THE INVENTION

Japanese text employs four different writing systems that each employ separate character sets. These writing systems are Hiragana, Katakana, Kanji and Romaji. Katakana characters represent syllables, typically consonant and vowel combinations and are used for writing words borrowed from Western languages, such as English. Hiragana characters also represent syllables and are used most extensively for writing grammatical words, such as adverbs, functional categories, such as verbal inflection, and other markers. Hiragana and Katakana are collectively known as Kana. Depending on the corpora, words written in Hiragana and Katakana have an average word length between three and five characters. Kanji characters are characters that were mostly borrowed from Chinese and are ideographic characters that represent meaning. Romaji are Roman characters, such as found in the Roman alphabet that is used for English.

In natural language processing, the presence of the multiple writing systems complicates the task of processing and parsing Japanese text. This task is further complicated by the manner in which words are written in Japanese. In particular, words are written together without separating spaces (i.e., there are no delimiting white spaces between words). It is, thus, difficult for a computer system to identify individual words within a text string written in Japanese. One conventional approach has been to maximally match Kana and Kanji in the text string with words in a dictionary. Unfortunately, in order to identify a large number of words, this approach requires a large dictionary that is too large to efficiently store in primary memory (i.e., RAM). As a result, the dictionary must be stored in secondary memory and the overhead associated with accessing secondary memory must be incurred each time that a word is sought from the dictionary. Moreover, even very large dictionaries cannot guarantee complete coverage of all words. This difficulty is complicated by the dynamic nature of what words are part of a given natural language. Words are added (i.e., new words are coined) and words are removed from a language (i.e., words fall out of use or become antiquated) as time progresses. Thus, a fixed dictionary, by its nature, limits the coverage for words of a given language, and the dictionary will lose coverage over time.

SUMMARY OF THE INVENTION

In accordance with a first aspect of the present invention, a method of representing analysis of an input string of natural language characters is performed on a computer system that has a storage. Per this method, the input string is processed to identify natural language characters in the string and morphemes in the string. A structure is created in the storage that holds a directed acyclical graph that holds morpheme transitions and spelling for morphological analyses of the input string.

In accordance with another aspect of the present invention, n-gram templates are provided that specify a pattern of character types found in stems. Each template also includes information regarding likelihood of the template occurring in a stem. At least some of the templates are matched to a portion of an input string to identify matching ones of the templates. The matching templates are used to identify what portion of the input string is a stem.

In accordance with a further aspect of the present invention an input string of Japanese characters is provided and morphological analysis is performed on the input string in a right-to-left fashion by processing a rightmost character first and proceeding to process characters in sequence to the left of the first character. The morphological analysis identifies bound morphemes and at least one lexeme in the input string.

In accordance with an additional aspect of the present invention, morphological analysis is performed on an input string of Japanese characters to yield a directed acyclical graph. This graph has nodes representing characters or morphemes and pointers interconnecting the nodes. The graph has a root node and leaf nodes. For each leaf node, there is a path that leads from the leaf node to the root node and represents a morphological analysis of at least a portion of the input string that includes bound morphemes. The paths that lead from the root node to the leaf nodes are scored to favor paths that include analysis for a greater portion of the input string and favor paths that include a greater number of bound morphemes. The highest scoring path is selected as the morphological analysis to be applied to the portion of the input string.

In accordance with another aspect of the present invention a method of processing an input string of Japanese characters is performed on the computer system. In accordance with this method, phrase breaks are identified in an input string by applying a statistical technique. The phrase breaks delimit phrases. For each phrase within the input string a number of steps are performed. First, possible postfix bound morphemes are identified and a graphical representation of such morphemes is created. Possible stems in the phrase are identified by comparing characters in the input string with stem character templates that identify a pattern of character types in a stem. Possible prefix bound morphemes are identified for each possible stem. A graphical representation of the prefix bound morphemes is created. A best combination of the possible postfix bound morphemes, stems and prefix bound morphemes is chosen as an analysis of the phrase input string that best characterizes the input string.

In accordance with a further aspect of the present, invention a method is practiced in a computer system that lacks a fully specified dictionary. Per this method, an input string of characters is provided where the characters lack white spaces between themselves. The input string is processed to identify words, stems, and affixes in the words.

In accordance with another aspect of the present invention the text of a document that has characters is processed to obtain a morphological map of the text. Markers are inserted into the morphological map to identify selection boundaries within the text. When a user uses the input device to request a selection of text, the markers are used to identify the granularity of the resulting selection.

BRIEF DESCRIPTION OF THE DRAWINGS

A preferred embodiment of the present invention will be described below relative to the following drawings.

FIG. 6 is a depiction of an example of a Japanese input text string that has been processed to identify HPB's.

FIG. 9 depicts an example of a morpheme entry.

FIG. 13 depicts a scoring table for the postfix scoring section that is used in the preferred embodiment of the present invention.

DETAILED DESCRIPTION OF THE INVENTION

Figure 1:
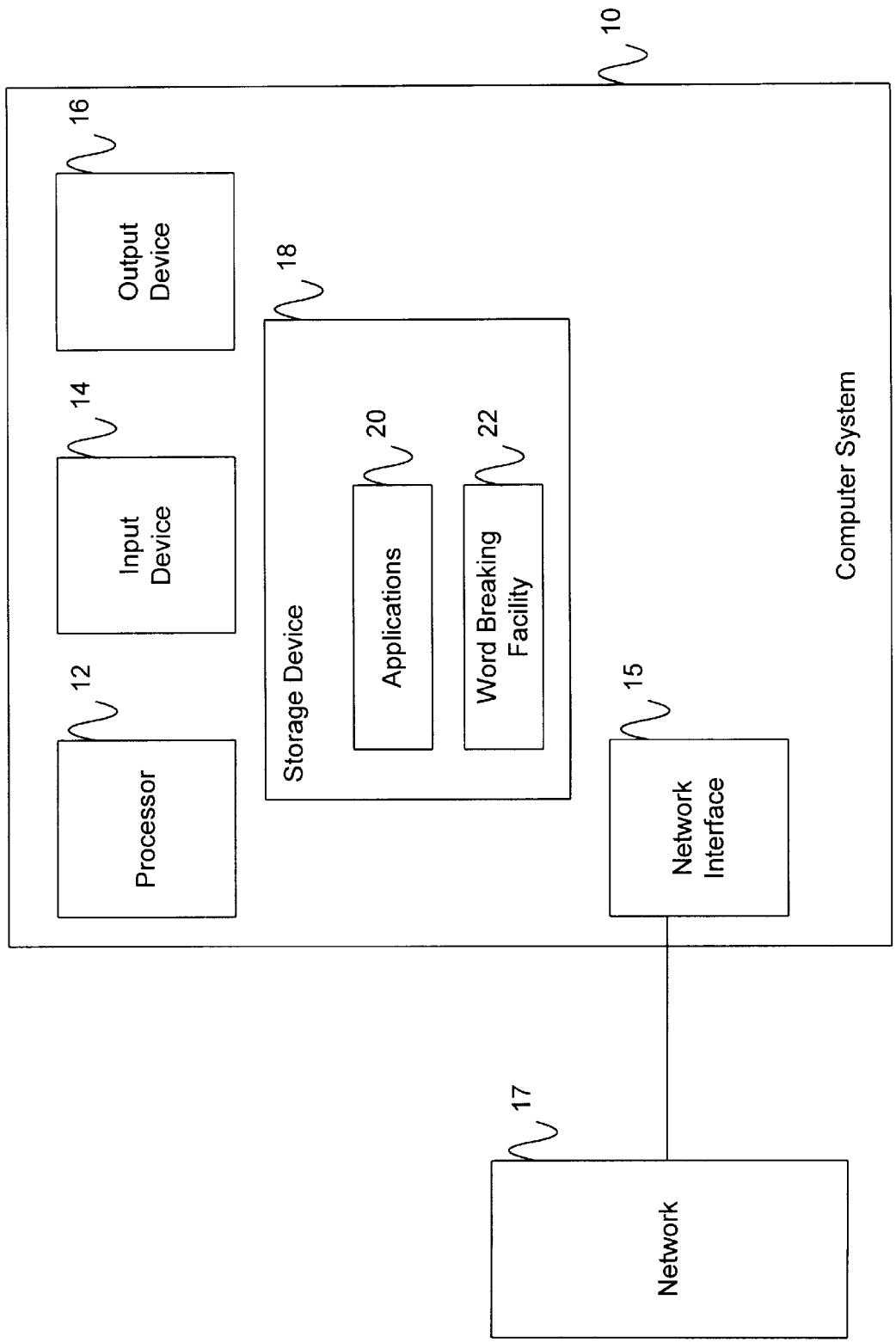
FIG. 1 is a block diagram of a computer system that is suitable for practicing the preferred embodiment of the present invention.

The preferred embodiment of the present invention concerns a word breaking facility for breaking a text string of Japanese into separate words or jiritsugo phrases. The preferred embodiment of the present invention performs preliminary morphological processing on the text string to reduce the dependency of the system on large static dictionaries and to avoid the access overhead and unknown word identification problems associated with "up-front" dictionary usage. The preferred embodiment of the present invention employs a unique morphological map that incorporates transitions among morphemes that are identified by the morphological processing. This map is a very compact representation of morphological analyses. The preferred embodiment of the present invention also employs ophemes (orthographemes), which are character-type template patterns that are used during stem analysis to identify stems.

The morphological analysis performed by the preferred embodiment seeks to identify "morphemes," which are basic units of meaning or more formally, indivisible linguistic units. Each morpheme may be a stand alone linguistic unit that contains content, known as a "stem," or a bound linguistic unit that is bound to a stem. In the discussion below for Japanese text, the stems will be referred to as "jiritsugo," and the bound morphemes will be referred to as "fuzokugo." An example helps to illustrate the distinction between stems and bound morphemes. The English word "walks" includes a stem "walk" and a bound morpheme "s." The stem "walk" holds content that means to move over a surface by taking steps with feet at a pace; whereas "s" is functional and specifies that the verb is for third person singular present.

The preferred embodiment of the present invention identifies jiritsugo phrases, which is a unit that contains one or more autonomous words, or jiritsugo stems plus any number of dependent morphemes. These dependent morphemes typically take the form of affixes (i.e., either prefixes or postfixes). One exception is that a jiritsugo phrase may include a compound noun or a compound verb that involves multiple jiritsugo. Such compound nouns and compound verbs will be discussed in more detail below.

The preferred embodiment of the present invention also employs a novel combination of statistical methods to process the input text string. First, statistical probabilities for breaking unigrams and breaking bigrams are applied to determine the probability of hard phrase breaks (HPB's) being present within the input text string. A HPB specifies a location of the text string that has a very high probability of serving as a boundary point between two phrases. The preferred embodiment of the present invention also utilizes inter-soft phrase break (inter-SPB) morpheme bigrams and intra-soft phrase break (intra-SPB) morpheme bigram probabilities. A soft phrase break specifies breaks between jiritsugo phrases that are determined during analysis of text between HPB's. A possible jiritsugo phrase analysis is bounded by SPB's, but the term SPB will be used below to refer to a jiritsugo phrase. Inter-SPB morpheme bigrams refer to bigrams formed by morphemes in two different soft phrase breaks, whereas intra-SPB morpheme bigrams are formed by morphemes within a single soft phrase break. These bigram probabilities are used to weight possible morphological analyses and to constrain certain stem analyses. Kanji bigram probabilities are also provided to weight certain stem analyses.

FIG. 1 is a block diagram of a computer system 10 that is suitable for practicing the preferred embodiment of the present invention. Those skilled in the art will appreciate that the computer system 10 depicted in FIG. 1 is intended to be merely illustrative and that the present invention may be practiced with other computer system configurations, including distributed systems and multiprocessor systems. The computer system 10 includes a processor 12, at least one input device 14 and at least one output device 16. The input device 14 may be, for example, a keyboard, a mouse, a microphone, a pointing device, a digitizing tablet or other input device. The output device 16 may be, for example, a video display device, a printer, a loudspeaker or other output device. The computer system 10 may also include a network interface 15 that interfaces the computer system with a network 17. The computer system additionally includes a storage device 18 that holds application programs 20 and a word breaking facility 22. The word breaking facility 22 holds the instructions for performing the preferred embodiment of the present invention described herein. Although the word breaking facility 22 is depicted in FIG. 1 as being distinct from the application program 20, those skilled in the art will appreciate that the word breaking facility may be integrated directly into the application programs or may be a stand alone facility that is part of a system library or operating system.

Figure 2:
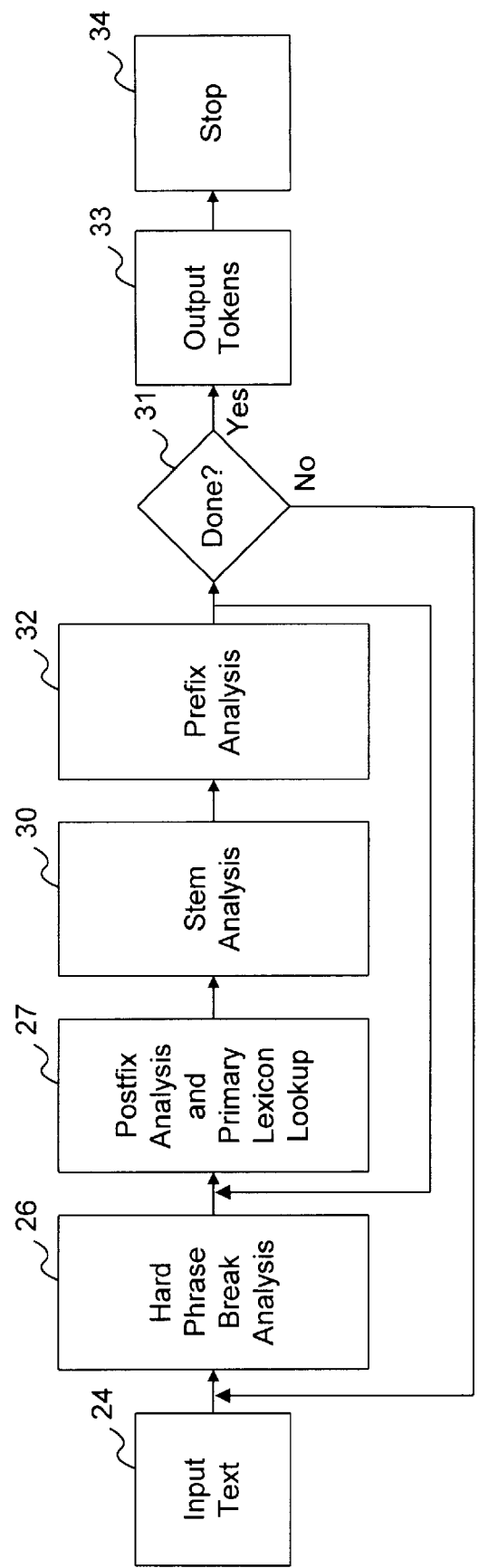
FIG. 2 is a block diagram depicting the various analysis stages that are performed by the preferred embodiment of the present invention.

FIG. 2 is a block diagram illustrating the stages of processing that are performed by the word breaking facility 22 to identify jiritsugo phrases in an input Japanese text string. The analysis stages of FIG. 2 will be described below in conjunction with the flowchart of FIG. 3. Initially, HPB analysis 26 is performed on a section of Japanese input text 24 to locate HPB's in the input text (step 36 in FIG. 3). The input text 24 may take different forms. For example, the input text may be a portion of a word processing document. Alternatively, the input text 24 may be entered by a user using the input device 14, or may be part of another type of document. The HPB's are identified through statistical techniques. In particular, as shown in FIG. 4, the HPB analysis 26 relies upon unigram and bigram phrase break probabilities 47 to statistically identify where phrase breaks are most likely to occur within the input text 24. The unigram and bigram phrase break probabilities 47 holds data regarding breaking unigrams (i.e., single characters, such as punctuation marks) and breaking bigrams (two characters). In particular, for each unigram, an identification of the character and the phrase break location relative to the character are stored, whereas for bigrams an identification of a first character and the character class of the character that follows the first character are stored. Those skilled in the art will appreciate that in alternative embodiments, the unigrams may hold data for a character class rather than an identification of a character. Moreover, the bigrams may alternatively hold character class data for both characters, hold no character class data or hold character class data for the first character but identification information for the second character. The character classes include punctuation, Hirigana, Katakana, Kanji and Romaji. In one embodiment, probabilities are stored for left-breaking unigrams, right-breaking unigrams and bigrams with a break between the characters.

The probabilities for the breaking unigrams and bigrams are obtained by processing tagged corpora that identifies breaking unigrams and bigrams. In general, the break in frequency of a left-breaking unigram or a right-breaking unigram is the number of times that a break occurs to the left or right, respectively, for the unigram divided by the total number of breaks in the document. The probability of breaking for the unigram is equal to the breaking frequency divided by the total frequency of occurrences in the corpora. For a bigram, the breaking frequency is the number of times that a break occurs between the two tokens that make up the bigram divided by the total number of breaks in the document. The probability of breaking up the bigram is equal to the breaking frequency divided by the total frequency of the bigram (both breaking and nonbreaking) in the corpora.

Figure 4:
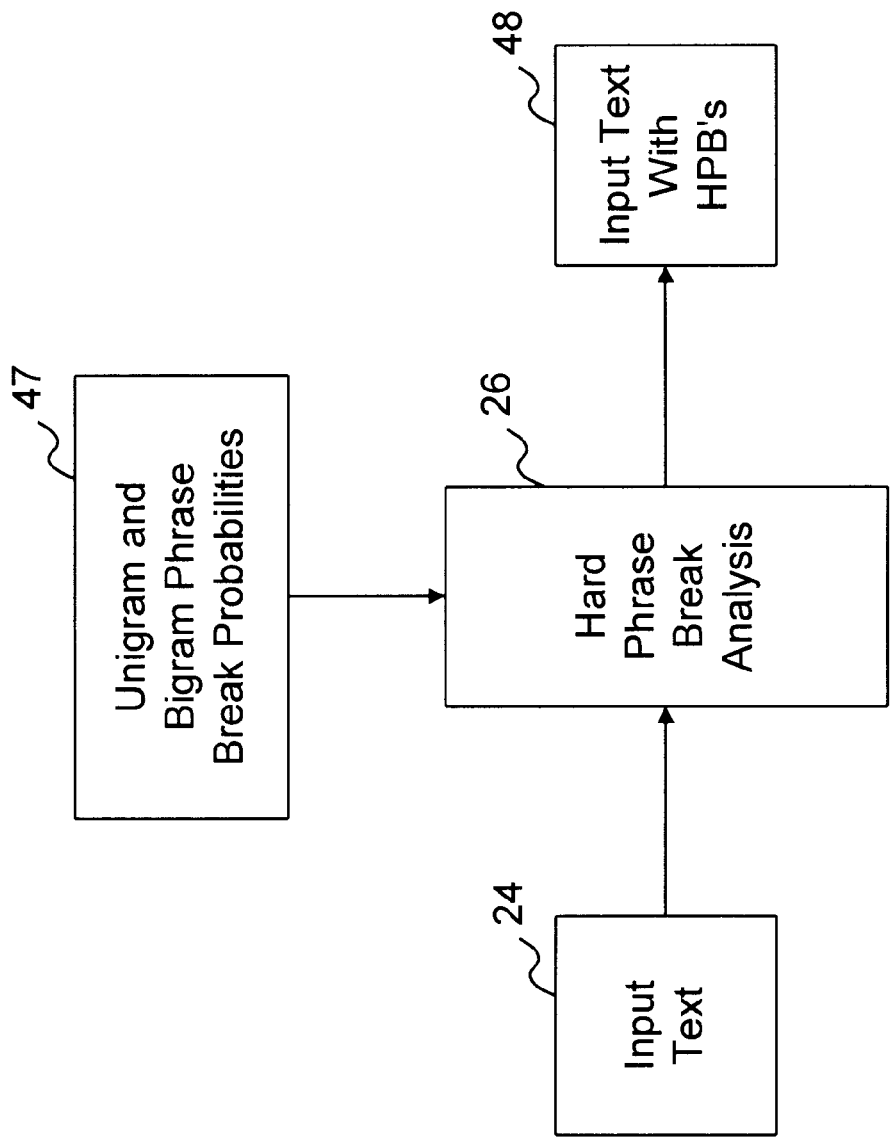
FIG. 4 is a block diagram illustrating the processing performed in hard phrase break (HPB) analysis.
Figure 5:
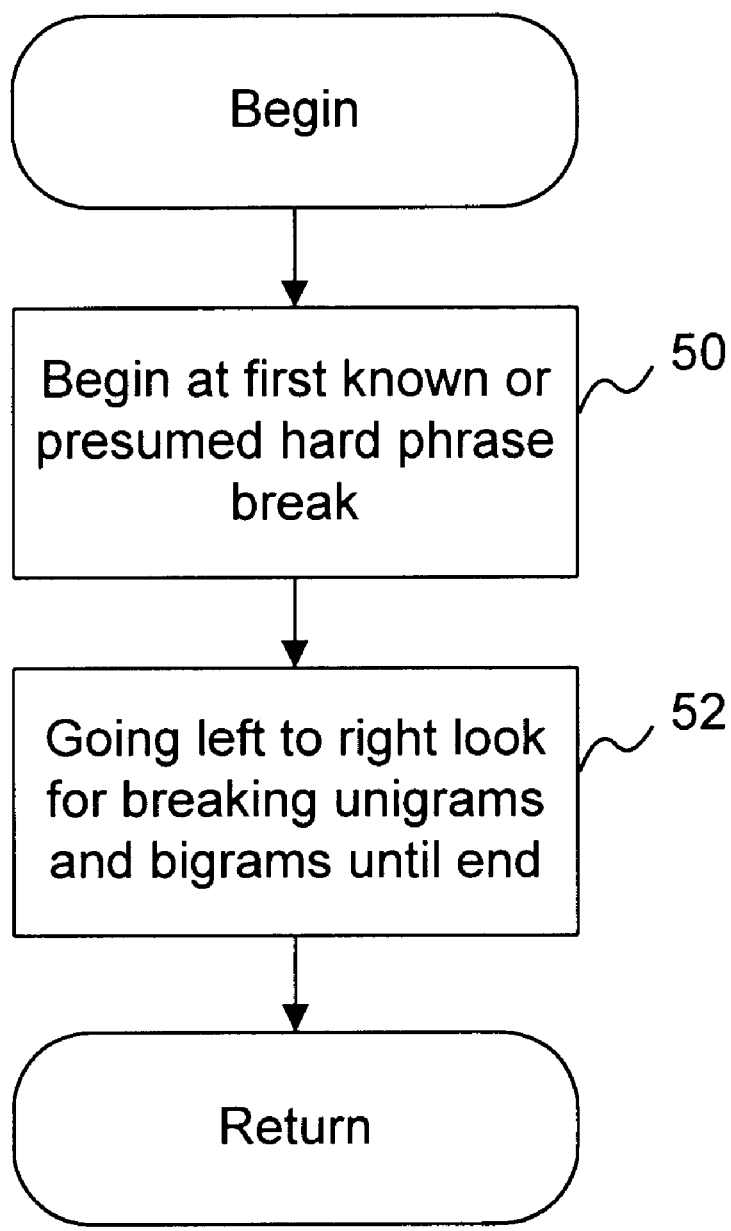
FIG. 5 is a flowchart illustrating the steps that are performed during HPB analysis.

FIG. 5 is a flowchart illustrating the steps that are performed in the HPB analysis 26. The processing of the input text 24 begins at the first known or presumed HPB (step 50 in FIG. 4). Where the first known or presumed hard phrase break is depends upon how a number of bit flags are set by the client application 20 that calls the word breaking facility 22. If the TOKENIZE_HPB_END bit is set, it is assumed that the last character of the input text 24 precedes a HPB. If the TOKENIZE_HPB_BEGIN bit is set, it is assumed that the first character follows a hard phrase break. In general, the hard phrase break analysis proceeds from the first to the last known or presumed hard phrase breaks.

An example is helpful in illustrating the effects that these bit flags have on the processing in the HPB break analysis 26. Suppose that the input text is as follows:

ABC/DEF/GHI

In the above example the HPB's are designated by slashes surrounded by spaces. If neither of the bit flags are set, HPB analysis is performed on "DEF" because no hard phrase breaks are presumed and only the known phrase breaks are present. If the TOKENIZE_HPB_BEGIN bit flag is set, HPB analysis is performed on "ABCDEF" because a phrase break is presumed at the beginning of the input text. If only the TOKENIZE_HPB_END bit flag is set, HPB analysis is performed on "DEFGHI" because a phrase break is presumed at the end of the input text. Lastly, if both the TOKENIZE_HPB_BEGIN bit flag and the TOKENIZE_HPB_END bit flag are set, then HPB analysis is performed on "ABCDEFGHI."

In general, the HPB analysis 26 is done by comparing each character or each pair of adjacent characters to the unigram and bigram phrase break probabilities 47 to determine if there is a match (step 52 in FIG. 5). If there is a match, the HPB is duly noted by putting a probability for the phrase break in an entry in a designated array. The word breaking facility 22 maintains an array which describes each character-character edge in the input text 24. Each entry in the array includes a value that corresponds to the log base 2 of the break probability. Hence, the HPB analysis 26 results in an input text with the hard phrase breaks noted 48 (FIG. 4).

FIG. 6 shows an example of a portion of an input text that has been processed to identify hard phrase breaks. In the example shown in FIG. 6, the HPB's are designated by "|". The input text also has SPB's noted by "/". How the SPB's are located will be described in more detail below.

The word breaking facility 22 then proceeds to process the characters within each subsection of the input text that is delimited by HPB's. Presumably, each of these subsections potentially holds a jiritsugo phrase. Punctuation characters specifying HPB unigrams are treated as single character jiritsugo phrases. The first step in this processing of the subsections is the postfix analysis and primary lexicon lookup 27 which seeks to identify postfix morphemes that are bound to a stem (step 38 in FIG. 3) and favor certain lexicalized words that are homographic with selected postfix analyses (step 37 in FIG. 3). This stage 27 of the processing takes the subsection of the input text and generates a morphological map (which is a directed acyclical weighted graph) that holds all possible morphological analyses for the characters within the subsection. The role and format of this morphological map will be described in more detail below.

For purposes of efficiency, the preferred embodiment of the present invention performs a primary lexicon lookup (step 32 in FIG. 3) before beginning the postfix analysis. In particular, strings to the immediate left of a hard phrase break are looked up in the primary lexicon 96 (FIG. 7) to determine if they are strings that end with a Hiragana character and have zero length postfix analyses. The primary lexicon lookup avoids having to add each of the up to 18 zero length postfix analyses that may follow a Hiragana character to the morphological map.

Figure 7:
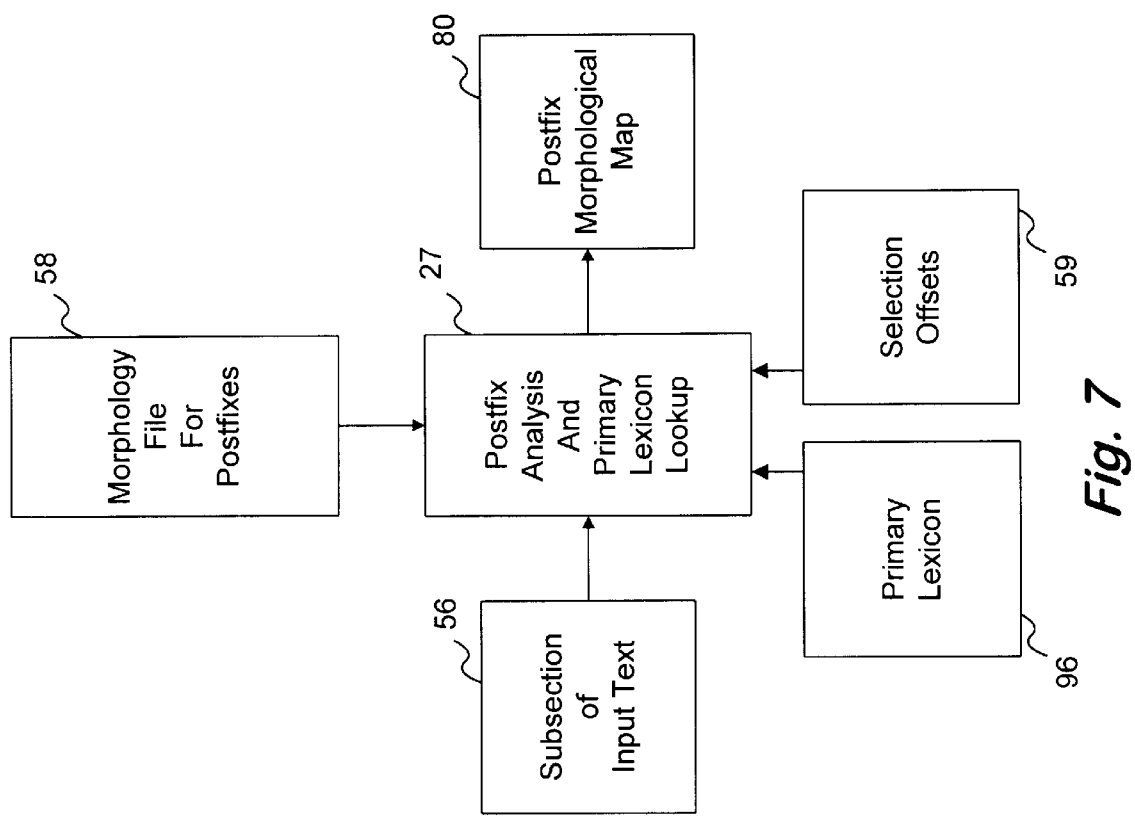
FIG. 7 is a block diagram illustrating the data flow in postfix analysis.

As shown in FIG. 7, postfix analysis uses a morphology file 58 to build a postfix morphological map 80 for the subsection of input text 56. The morphology file 58 contains morphemes. The morphology file 58 contains morphemes only for bound morphemes or morphemes that are to be treated as bound morphemes. In the preferred embodiment of the present invention, the morphology file 58 may contain, for example, between 600 and 1,000 morphemes. Each morpheme has a format like that depicted in FIG. 9. In particular, each morpheme specifies a name for the morpheme (e.g, "INFL_vADJ_kattari" in FIG. 9). Each morpheme also contains an "Analysis" section that specifies analyses wherein each analysis contains a paradigm and the surface representation of the morpheme for the paradigm. In the example shown in FIG. 9, "ADJ" identifies the adjective paradigm, and the Japanese characters that are to the right of "<<" are the surface representation of the morpheme. The paradigm specifies a morphological category (MCat) for the next character to the left of the bound morpheme in the input text. The paradigm roughly corresponds to a designation of part of speech. The morpheme also includes a "Next States" section. The "Next States" section specifies the states that may follow the morpheme to the right. For example, the RNONE state specifies an instance where there are no characters to the right of the morpheme. The states listed in the "Next States" section may include constraints. For example, the state INFL_verb_6 state includes an analysis designated as "SURU" (which corresponds to the name of the paradigm in the analysis). The listing of "INFL_verb_6:SURU" in the "Next States" section in FIG. 9 indicates that only the SURU analysis of the INFL_verb_6 morpheme may follow the INFL_vADJ_kattari morpheme. In addition, selection information (step 59 in FIG. 7) may be included for selected morphemes, as will be described in more detail below.

Figure 8:
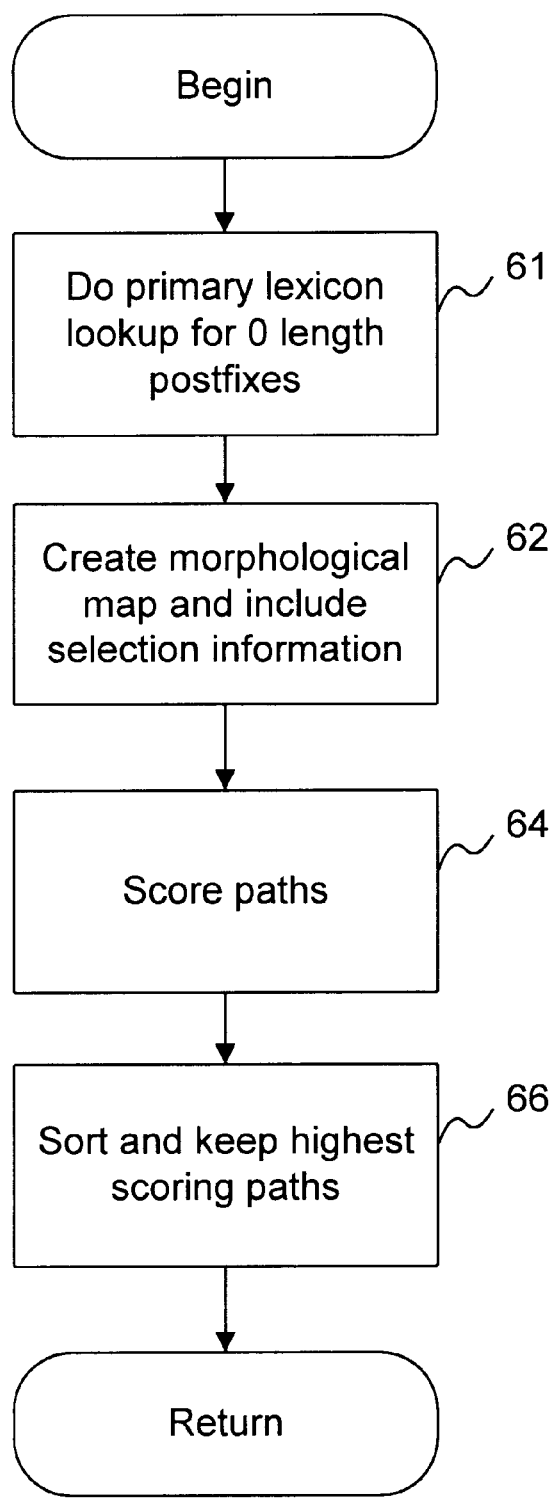
FIG. 8 is a flowchart illustrating the steps that are performed during postfix analysis.
Figure 10:
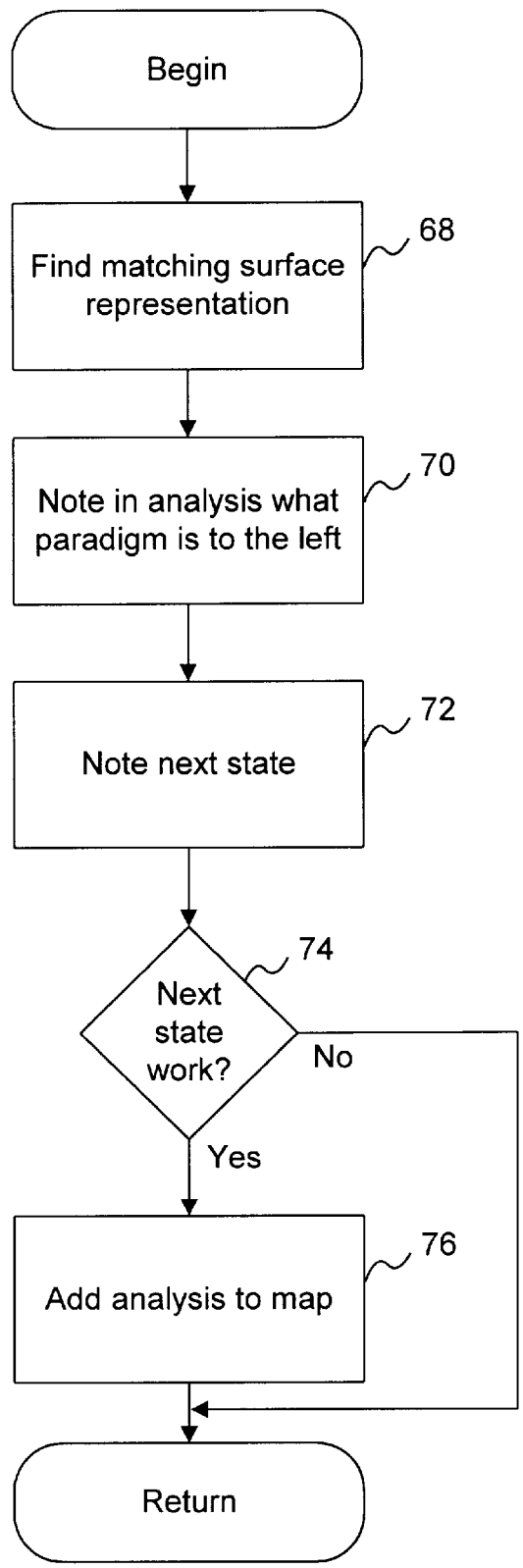
FIG. 10 is a flowchart illustrating the steps that are performed in one iteration of the postfix analysis.

FIG. 8 is a flowchart that provides an overview of the steps that are performed in a single iteration in the postfix analysis and primary lexicon lookup 27. Initially, the strings that are to the immediate left of a HPB that end with a Hiragana are looked up in the primary lexicon 96 (FIG. 7) to identify Hiragara characters with zero length postfix analyses (step 61). Next, the subsections of input text 56 are processed to create the postfix morphological map with selection information 80 (step 62 in FIG. 8). Selection boundaries are incorporated into the morphological map, as will be described in more detail below. Specifically, underscores that designate selection boundaries may be incorporated into the morphological map. During postfix analysis, when an underscore is encountered, a selection offset 59 is created that identifies the number of characters from the next selection boundary (or between successive selection boundaries) in the input text. This postfix analysis uses the morphemes contained in the morphology file 58. In general, the steps depicted in FIG. 10 are performed for each surface representation of a morpheme that finds a match in the morphology file 58. In postfix analysis, the processing occurs from right to left beginning at a hard phrase break and continuing until there are no longer any characters that have matching surface representations in the morpheme stored in the morphology file 58 or until another hard phrase break is reached. Initially, a matching surface representation is found (step 68 in FIG. 10) by looking at the characters specified in the surface representation in the "Analysis" section of the morpheme and the characters in the subsection of input text 56 that is being processed. The paradigm of the analysis that contains the matching surface representation is noted (step 70) and the next state for the morpheme is identified (step 72). It is then determined whether the actual next state corresponds with any of the next states specified within the "Next States" section of the morpheme (step 74). A next state of a morpheme is internally the previous state. Since the analysis proceeds from right to left, the internal morphology graph is a reversed version of that which is depicted. If the next state matches one of those listed in the next states subsection, the analysis is added to the morphological map 80 (step 76). Otherwise, the analysis is not added to the morphological map. This process continues on a morpheme by morpheme basis until all possible analyses are exhausted.

Figure 11:
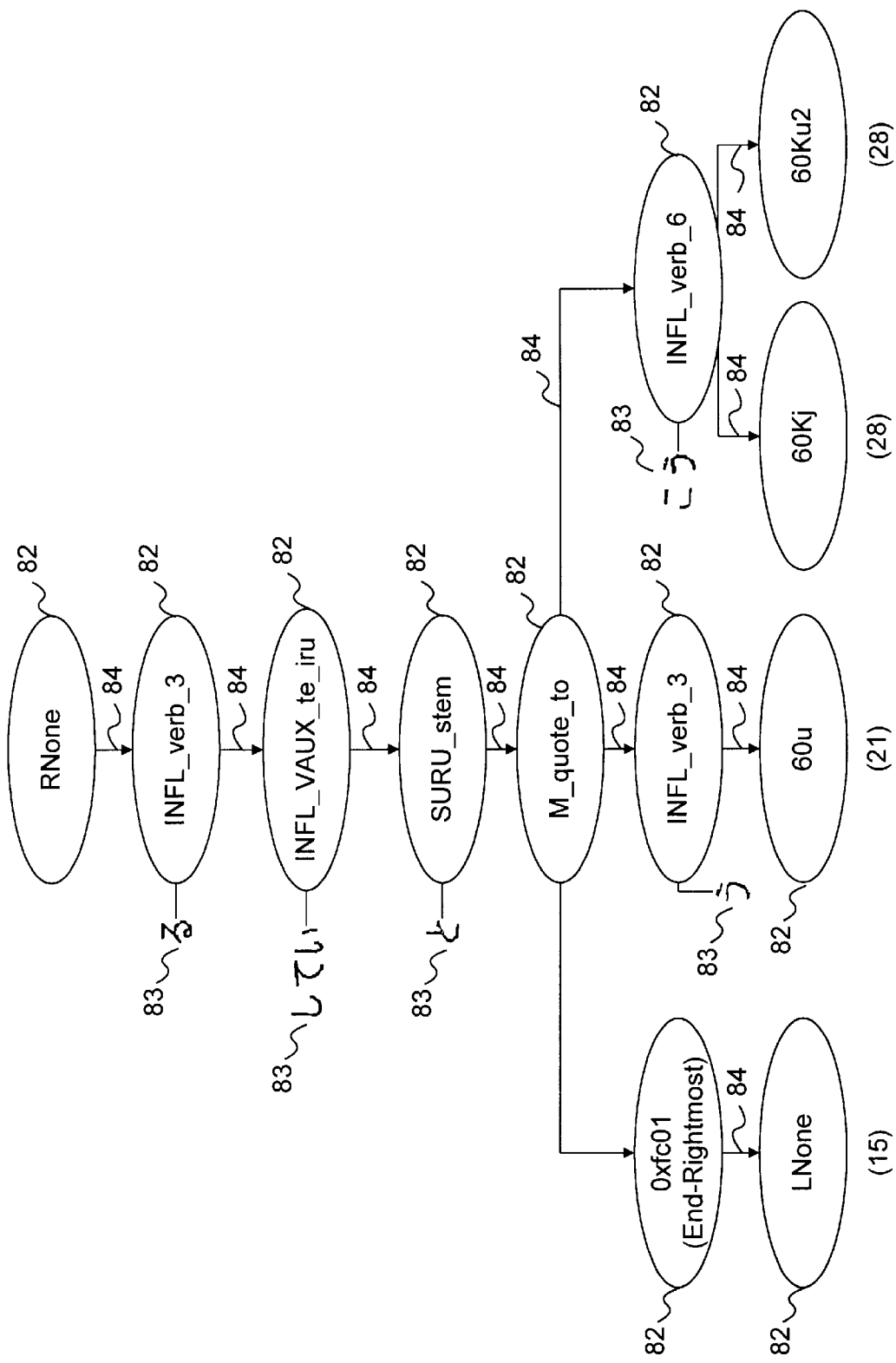
FIG. 11 is an example of a postfix morphological map.
Figure 12:
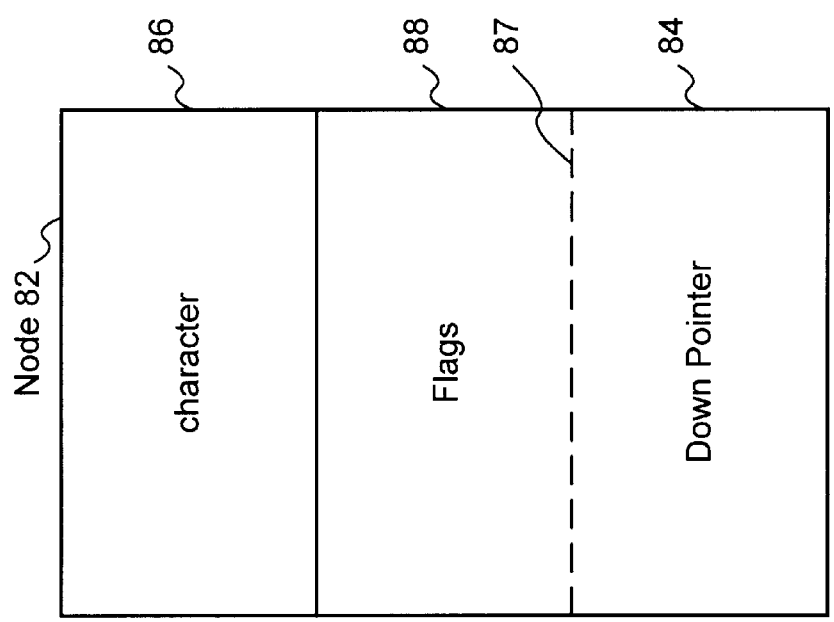
FIG. 12 depicts the format of a node in a postfix morphological map.

FIG. 11 depicts an example of a postfix morphological map 80 for the portion of the input string designated by bracket 55 in FIG. 6. The map includes a number of nodes 82 that are connected by pointers 84 which are represented with array offsets. The surface representations 83 of morphemes are also shown, and scores are shown in parentheses. The format of a node 82 is depicted in FIG. 12. Each node 82 includes a character field 86 that specifies a 16-bit unicode value (which may be specified by 4 hexadecimal digits) for the node that identifies the associated characters or morpheme. As mentioned above, metacharacters are encoded by such unicode values, using a portion of the special extended character range f800-feff, or thereabouts. The nodes may be "overloaded" as indicated by the dashed line 87 in FIG. 12 to specify the underscore. Each node 82 also includes a flags field 88 that holds a flag that specifies whether there is a down pointer and a flag that specifies whether the end of a word has been reached. The node additionally includes a down pointer field 84 that is used to hold a down pointer in the form of an offset to a next node in the morphological map. This postfix morphological map 80, thus, stores both spelling information and morphological information. The underscores for designating selection information are included in the spelling information. This facilitates a more compact representation of such data.

Figure 3:
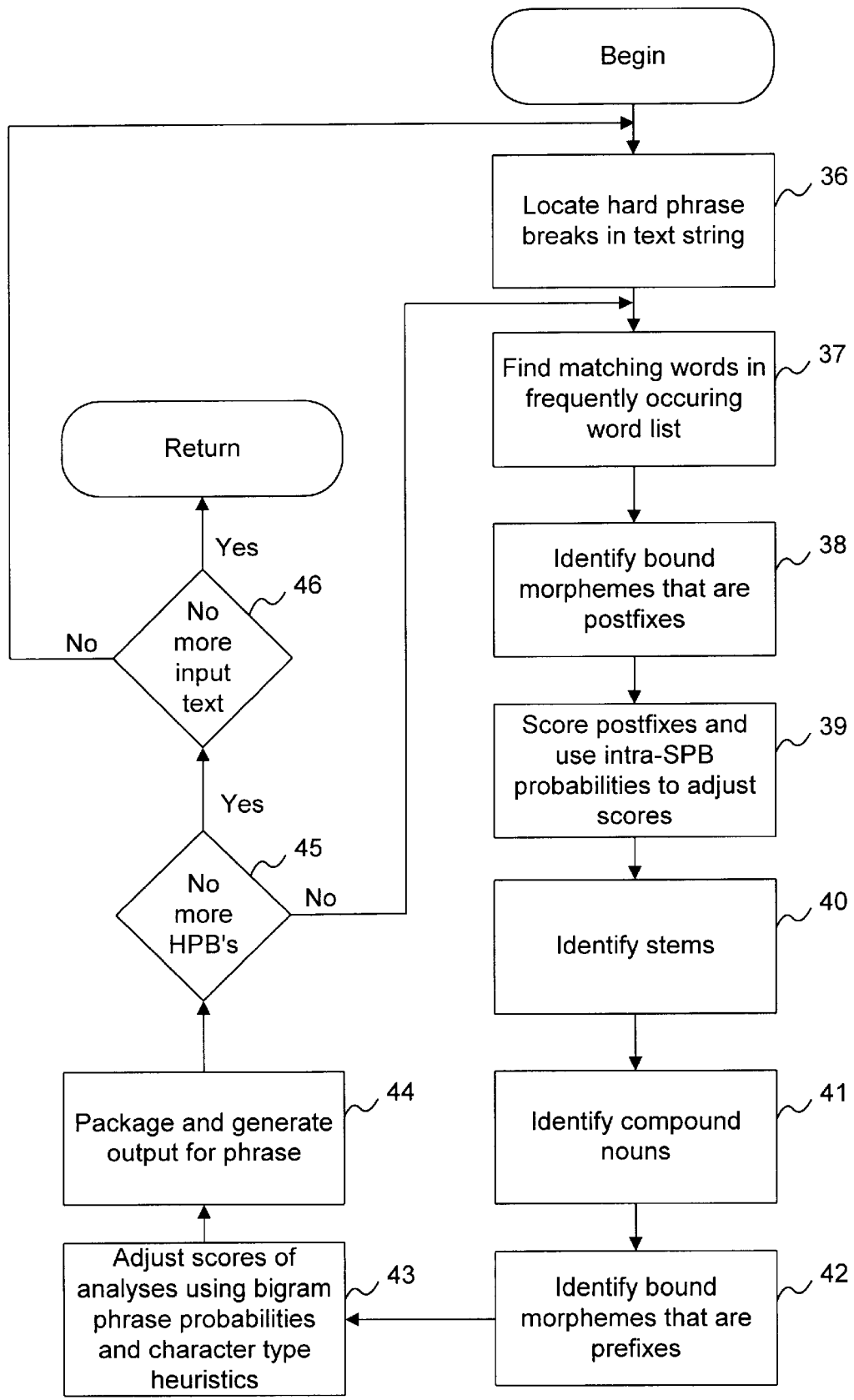
FIG. 3 is a flowchart illustrating the steps that are performed by the preferred embodiment of the present invention.

Each of the paths in the postfix morphological map 80 for each subsection of input text 56 is scored (step 64 in FIG. 8) and the scores are adjusted (step 39 in FIG. 3). Example scores are shown in parentheses in FIG. 11. The value of the score depends upon the number of characters in the path, the depth of the analysis (how deep the tree is that leads to the leaf at the end of the analysis) and the intra-SPB morpheme bigram probabilities. Thus, a value for the path that leads to each leaf of the postfix morphological map is initially calculated using the table depicted in FIG. 13 and is demoted or promoted slightly using intra-SPE, morpheme bigram probabilities (as will be described in more detail below). Those skilled in the art will appreciate that this table is intended to be merely illustrative and that other scoring approaches may be utilized. As can be seen from the table of FIG. 13, the scoring emphasizes analyses that have a larger number of characters and a deeper number of levels.

The system maintains intra-SPB morpheme bigram probabilities and inter-SPB morpheme bigram probabilities. These probabilities are derived by analyzing tagged corpora and determining the probability of the occurrence of such intra-SPB morpheme bigrams and inter-SPB morpheme bigrams. An example is helpful to illustrate what is meant by an intra-SPB morpheme bigram and an inter-SPB morpheme bigram. Given two SPB's A and B and morphemes a1, a2, a3 in SPB A and morphemes b1, b2, b3 in SPB B (the two SPB's may be represented as /a1 a2 a3/b1 b2 b3/), the inter-SPB bigram morpheme is formed by the two morphemes that are the last morphemes of the adjacent SPB's across the phrase boundary (i.e., a3 and b3). The intra-SPB bigram data refers to bigram data between morphemes within the SPB's. Thus, there are intra-SPB bigrams for BEGIN and a1; a1 and a2; a2 and a3; a3 and END; BEGIN and b1; b1 and b2; b2 and b3; b3 and END.

As mentioned above, the intra-SPB morpheme bigram probabilities are applied to each path that connects a leaf with the root of the postfix morphological map 80. The scores of the paths that include unlikely intra-SPB morpheme bigrams are demoted, whereas the paths that include intra-SPB morpheme bigrams that are likely to occur have their score promoted.

Once the scores are calculated for all of the paths of the postfix morphological map in step 64, the scores are sorted and the highest scoring paths are kept (step 66 in FIG. 8). The threshold at which paths are kept or discarded is empirically derived. For example, in one approach, the top 20 scoring paths of each morphological map are kept.

Figure 14:
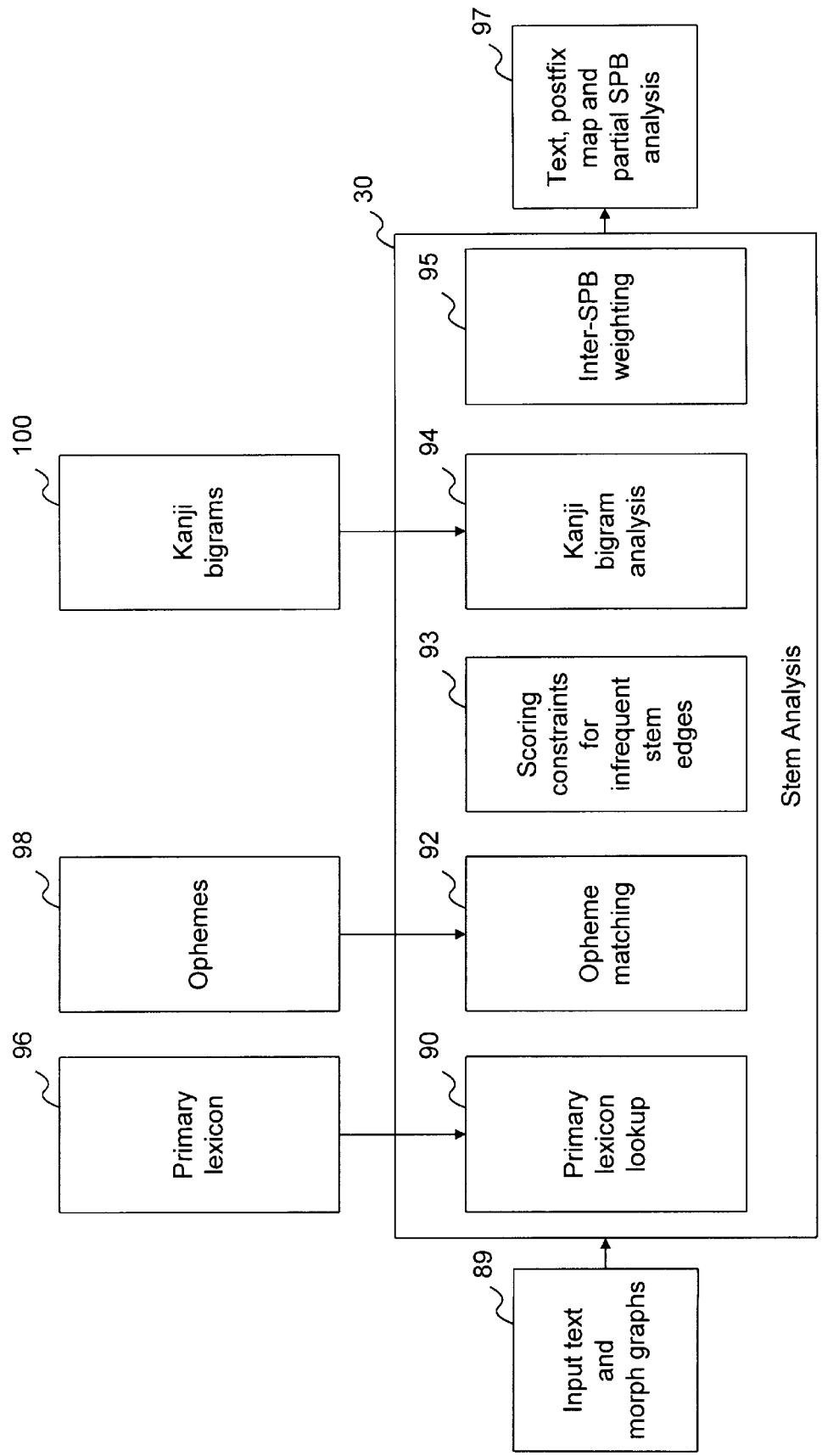
FIG. 14 depicts the analysis and data flow that are performed in stem analysis.

The word breaking facility 22 then proceeds to perform stem analysis 30 to identify stems (step 40 in FIG. 3). The central aim of the stem analysis 30 is to identify what characters constitute the stem, to which the postfix bound morphemes are bound. An exception is made for stems that include numerals, counters or other quantifiable units (for example, calendar dates, such as "06/27/965," quantities, such as "2 yen" and street addresses). This special class of stems is analyzed during postfix analysis. Special morphemes are provided and a special zero length MCat (LNONE) is provided for them. FIG. 14 is a block diagram that depicts the major functional components of the stem analysis 30. In general, the input text and postfix morphological maps 89 that were derived from the postfix analysis are used by the stem analysis 30. The stem analysis 30 includes primary lexicon lookup 90, opheme matching 92, scoring constraints for infrequent stem edges 93, Kanji bigram analysis 94 and inter-SPB weighting 95. The results of the stem analysis, 36 include text, the postfix map morphological maps and partial soft phrase break (SPB) analyses 95 (which will be described in more detail below).

The aim of the primary lexicon lookup 90 is to identify words that should not be treated as bound morphemes and to correct the treatment of such words. For example, adverbs may often be treated as bound morphemes because of their orthographical similarity to bound morphemes but should be treated as separate words. The primary lexicon 96 is organized as a directed acyclical weighted graph (like the morphological postfix and prefix trees) and holds adverbs, frequently used words (verbs, adjectives, etc.) and lexicalized compound words. In general, the primary lexicon 96 holds words that should not be considered as postfix bound morphemes. The primary lexicon 96 is divided into files where a file is provided for each MCat. Each file in the primary lexicon 96 contains a list of words. The aggregate primary lexicon 96 formed by these files is sorted by parts of speech and then by reverse unicode order.

Figure 15:
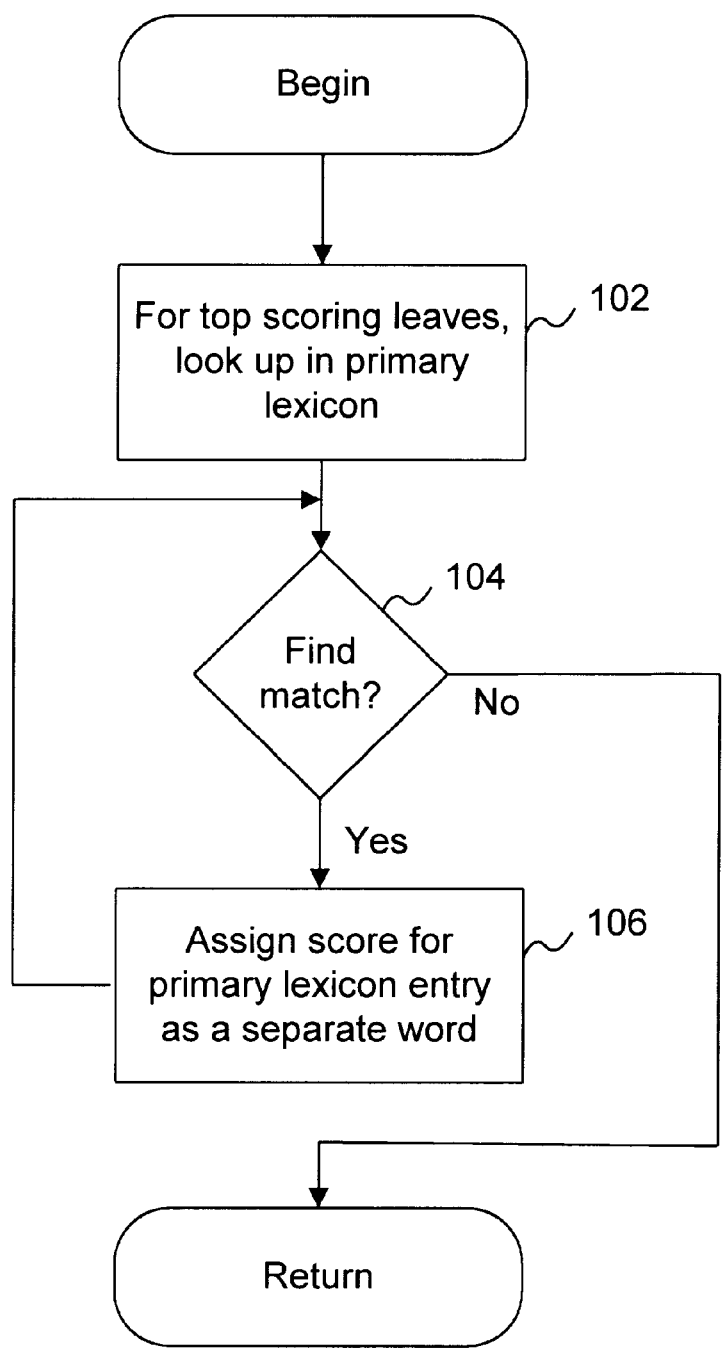
FIG. 15 is a flowchart illustrating the steps that are performed in primary lexicon lookup.

FIG. 15 is a flowchart illustrating the steps that are performed in primary lexicon lookup 90 for a given postfix morphological postfix map. The highest scoring leaves of the postfix tree are looked up in the primary lexicon (step 102 in FIG. 15). Only the highest scoring leaves are looked up in the primary lexicon 96 for purposes of efficiency. One exception, as described above, is for string analyses without postfixes ending in Hiragana, which by default have a postfix score of 1 (corresponding to an entry with length zero and one morpheme in FIG. 13) but which are always looked up. It is unlikely that the lowest scoring leaves will be chosen as the proper analysis and, thus, there is no need to determine whether any of the identified postfix bound morphemes should instead be treated as separate words. The threshold regarding what number or percentage of the leaves should be looked up in the primary lexicon is adjustable and may be chosen to best optimize such selection. If a matching entry is found in the primary lexicon (see step 104 in FIG. 15), it is an indication that the leaves should be treated as a separate word rather than as a bound morpheme. A score is assigned to each matching primary lexicon entry as a separate word, and the score is provided with a bonus to weight this analysis more favorably over the bound morpheme analysis. In general, there can only be n possible matches, where n is the length in characters of the maximum length stem (step 106 in FIG. 15). Analyses are provided for each of the primary lexicon entries. If, on the other hand, no match is found in step 104, the scores are not manipulated.

The stem analysis then performs opheme matching 92. As was discussed above, an opheme is a character type template for an MCat. For example, the opheme KK (which is representative of Kanji-Kanji) is a valid opheme for the VN2 MCat. The opheme specifies a pattern of character types found in jiritsugo phrases. The opheme matching 92 utilizes opheme templates 98 that store opheme patterns for stems and the log of the frequency in which the ophemes occur.

Each leaf of the given postfix morphological map 80 holds a value that specifies the part of speech of the character or characters that lie to the left of the postfix portion of the jiritsugo phrase. With the exception of zero-length stems, at least one of the characters to the left of the postfix bound morphemes represented by the postfix tree is a portion of a stem. The opheme matching 92 seeks to identify which of those characters are the stem.

Figure 16:
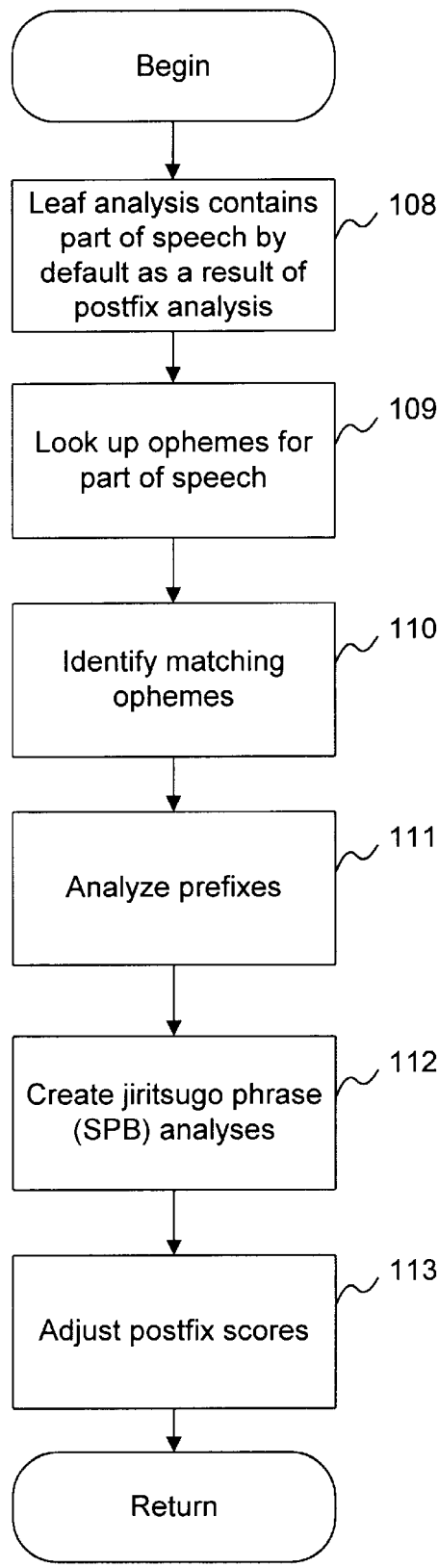
FIG. 16 is a flowchart illustrating the steps that are performed in opheme matching.

FIG. 16 is a flowchart illustrating the steps that are performed during opheme matching 92. For each leaf analysis, the part of speech associated with the leaf (that identifies the MCat associated with the stem) is known as a result of postfix analysis (step 107 in FIG. 16). As the opheme stem templates 98 are organized by parts of speech, the determined MCat of the leaf is used as an index to locate possible opheme patterns for stem with that MCat (step 109 in FIG. 16). The matching ophemes are identified (step 110 in FIG. 16), prefixes are analyzed (step 111) and jiritsugo phrase (SPB) analyses are created for the matching ophemes 28 (step 112 of FIG. 16). SPB analyses will be discussed in more detail below.

An example is helpful in illustrating how the opheme matching proceeds. Suppose that the string of Japanese characters that is being processed is "h.KHK.hhhKKhhP". In this example, the letters have the following meanings. H represents a Hiragana character that does not map to a bound morpheme; h represents a Hiragana character that is part of a bound morpheme; K represents a Kanji character; and P represents a punctuation character. The periods are used to specify the breaks between the prefix, stem and postfix. Further suppose that one of the postfix analyses (hhhKKhh) specifies the "GOsu" MCat class. In addition, suppose that the opheme stem templates 98 for the GOsu MCat class are as follows:

K,4
HK,0
HH,0
KK,0
H,0
KHK,0
HHHHHH,0
HKHK,0.

In the opheme templates set forth above, the first column specifies the character type template, the second column specifies character match information (which is empty in all these examples) and a third column specifies the log of the frequency of occurrence of the opheme template pattern.

The columns are separated by commas. For this example, the first, second, sixth and eighth ophemes match the input. These are matched in a right-to-left fashion at the beginning of the stem portion of the phrase that follows the postfix analysis. In this example, the sixth analysis is the best match because it matches all of the stem characters and allows for a successful prefix analysis.

Another example of opheme templates helps to illustrate the use of the second column in the opheme template, which specifies character match information:

VVV,0
HHHH,0
HHHH,1212,0
VVVV,1212,0
KK,0.

The value "1212" in the second column for the third opheme indicates that the first and third characters and second and fourth characters must be the same in order to match this opheme. Thus, for the third opheme to match, not only must all of the characters be Hiragana characters, but the first character and third character must be the same and the second character and fourth character must be the same. The second column may also hold the identity of characters that specify that a particular character in the surface representation (i.e., the input string) must be equal to the character specified within the second column at a given position.

In general, for each subsection of the input text string that is delimited by the HPB's, a tree of SPB analyses is created. Each SPB node in this tree 115 is associated with a given portion of the input text and includes a field 116 that holds an offset into a text array where the SPB begins. The SPB node 115 also includes a field 117 that holds the length (i.e., number of characters) of the SPB. Field 118 identifies the parent SPB of the SPB in the HPB analysis tree. Field 119 holds a count of the different jiritsugo phrases analyses coexisting within an SPB node, and field 120 holds a composite score for the SPB. Field 121 holds a secondary stem score and field 122 holds a value that specifies the level of the SPB in the SPB tree.

Figure 17A:
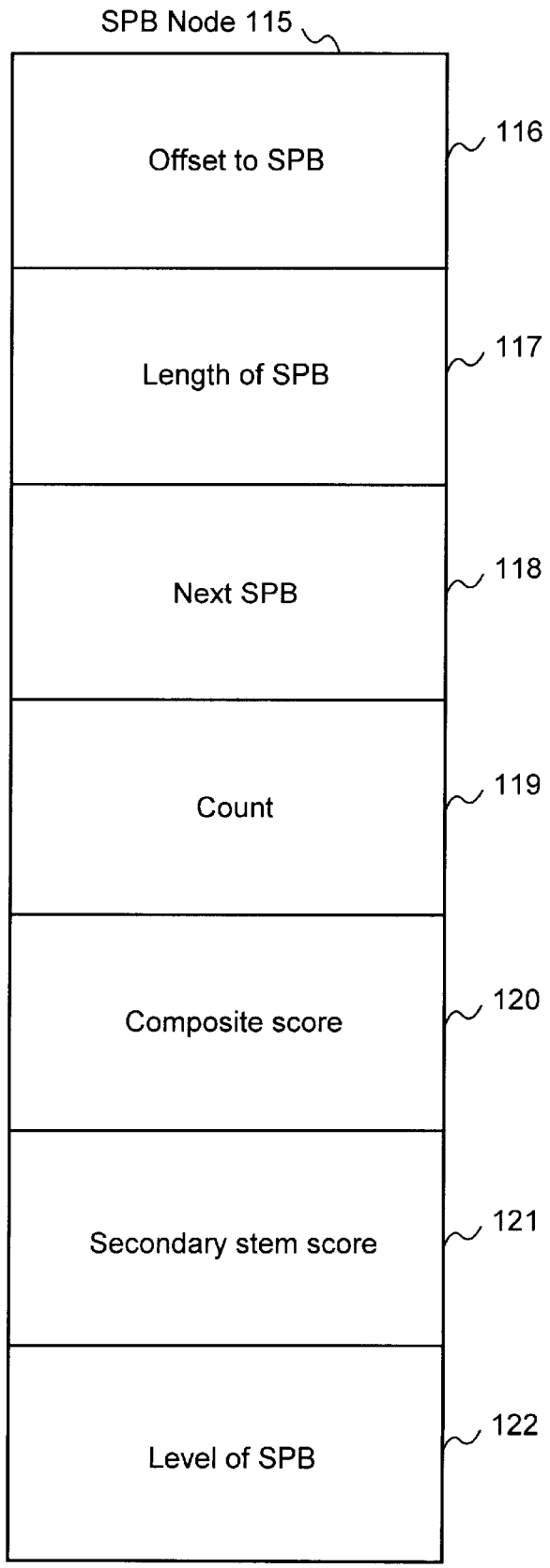
FIG. 17A depicts the format of a soft phrase break (SPB) node structure.
Figure 17B:
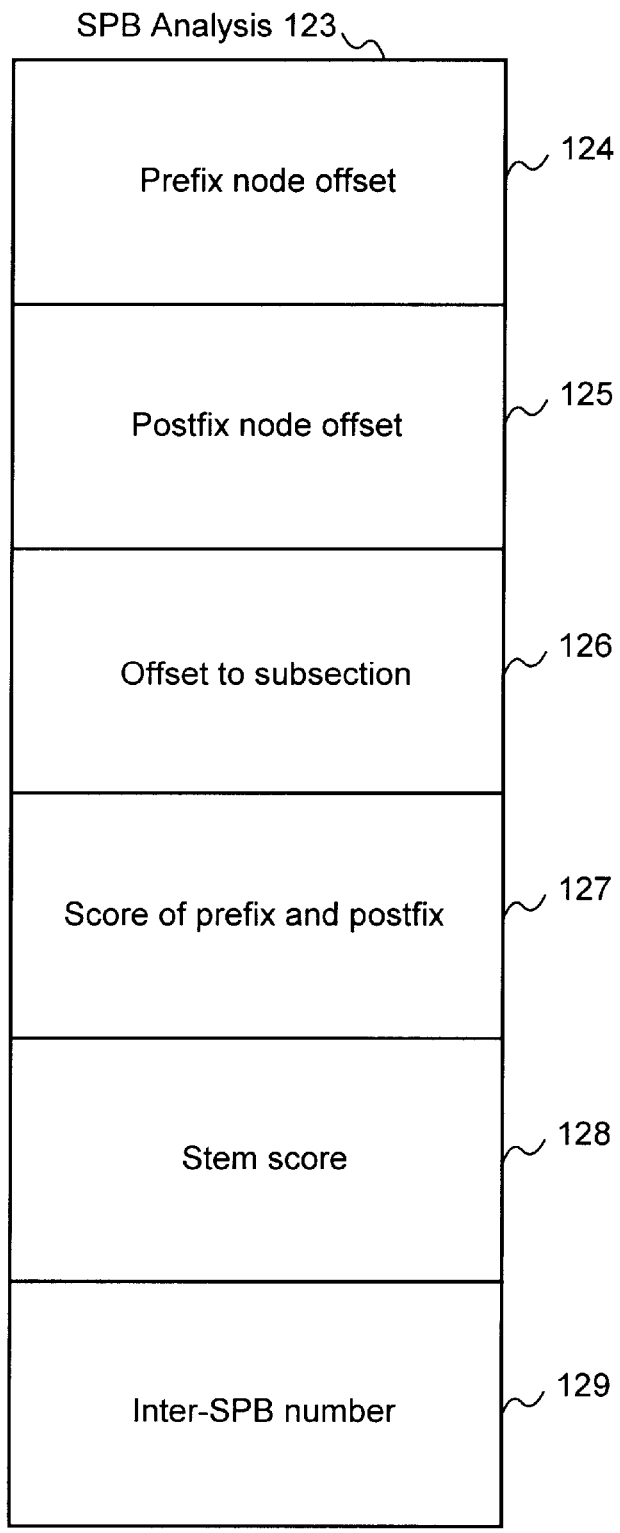
FIG. 17B depicts the format of an SPB analysis structure.

For each SPB node, an array of jiritsugo phrase analyses is kept. Each jiritsugo phrase analysis has a structure like that depicted in FIG. 17B. In particular, each jiritsugo phrase analysis 123 holds a field 124 that provides an offset to a prefix node in a prefix morphological map and a field 125 that holds a value that specifies an offset to a postfix node in a postfix morphological map. Field 126 holds an offset to a subsection where selection information is kept. Field 127 holds the score of the prefix analysis that is associated with the jiritsugo phrase analysis and a score of the postfix analysis that is associated with the jiritsugo phrase analysis. Field 128 holds the score of the stem portion (which is based upon the frequency of the associated opheme) and field 129 holds an inter-SPB number to cache that value.

Figure 17C:
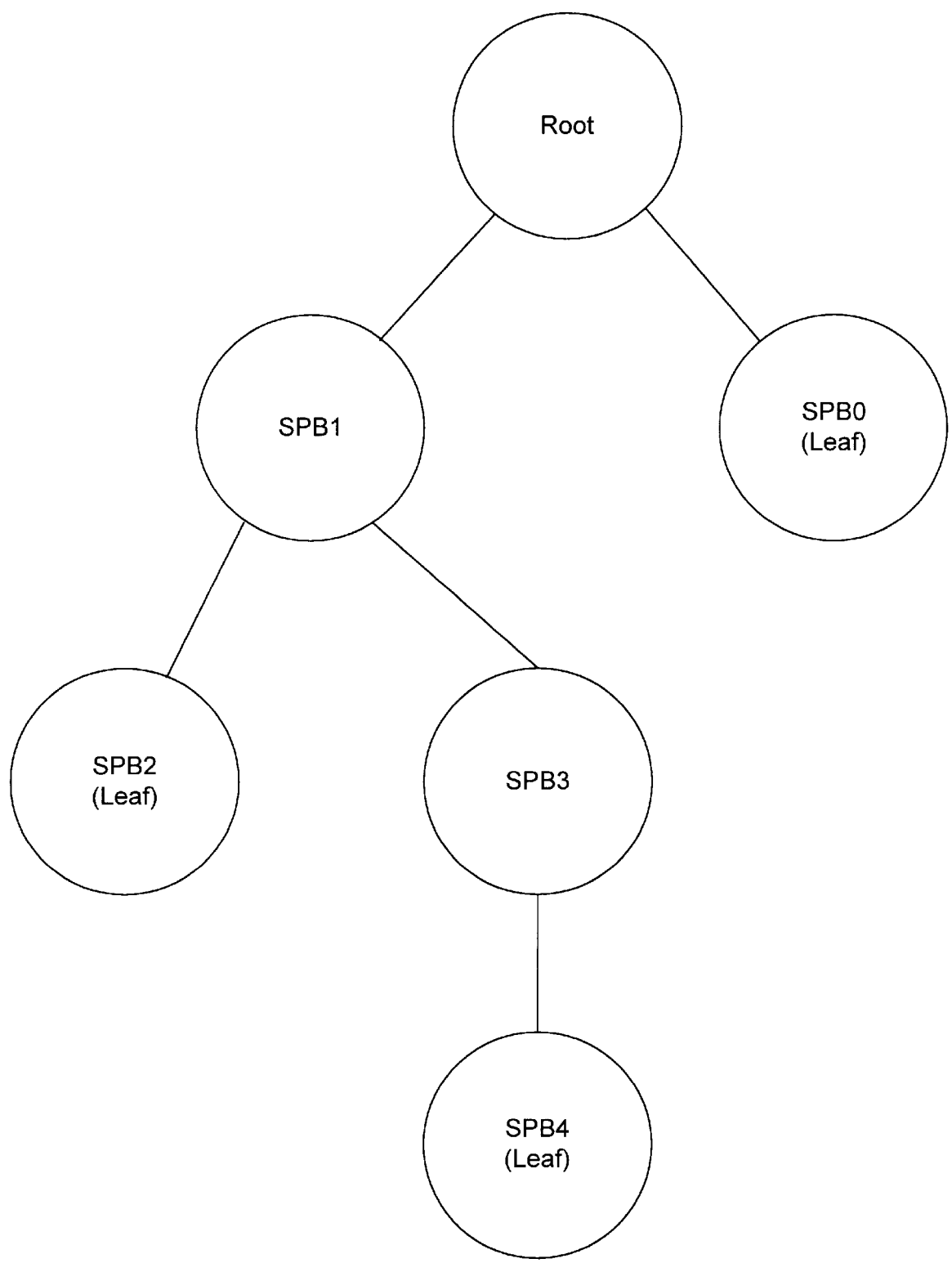
FIG. 17C depicts the format of an SPB analysis tree formed by SPB nodes.

FIG. 17C helps to illustrate an example of the tree of SPB nodes that is created for each HPB (i.e., for the text bounded by HPB's). The SPB analysis tree is formed by the SPB nodes, which have the structure like that discussed above. Each node points to an array of analyses that have a structure like that depicted in FIG. 17B.

In order to increase the likelihood that a postfix analysis is tied to a stem analysis that yields high frequency opheme pattern, the word breaking facility 22 rewards such postfix analyses. In particular, the postfix analyses are given bonuses to their scores when the resulting matching opheme is a high frequency opheme pattern. Thus, when a postfix analysis is coupled to an opheme pattern match via the creation of a jiritsugo phrase (SPB) analysis structure, the postfix analysis is given a reward if the opheme pattern is a highly occurring pattern (see step 113 in FIG. 16). Rewards are derived empirically by choosing values that produce the best results for a train corpus.

FIG. 14 depicts Kanji bigram analysis 94 as a separate component during the stem analysis 30. This depiction may be somewhat deceptive in that the Kanji bigram analysis is actually weaved into other analyses that are performed during the stem analysis. Kanji bigrams are bigrams of Kanji characters, and are useful in breaking compound nouns (step 41 in FIG. 3). A Kanji bigram analysis 94 uses a set of Kanji bigrams 100 that are stored like the character bigrams that were discussed above relative to the hard phrase break analysis 26. The Kanji bigrams 100 are used to identify the full maximum match length that corresponds to the longest acceptable string of Kanji characters in an opheme match and to account for compound nouns. The Kanji bigrams 100 are also used to constrain opheme matches so as to not allow opheme matches to cross hard phrase breaks (step 93 in FIG. 14).

As shown in FIG. 14, scoring constraints for infrequent stem edges are used to help demote possible SPB analyses that contain inter-SPB morpheme bigrams that are of low probability (step 95 in FIG. 4). For example, for the illustrated SPB analysis tree shown in FIG. 17C, the value of the inter-SPB morpheme bigram for SPB 1 and SPB 2 would be looked up to determine whether to demote or promote the analysis. The stored value for intra- and inter-SPB morpheme bigrams is derived from the based log of the probability of the bigram in a train corpus.

Figure 18:
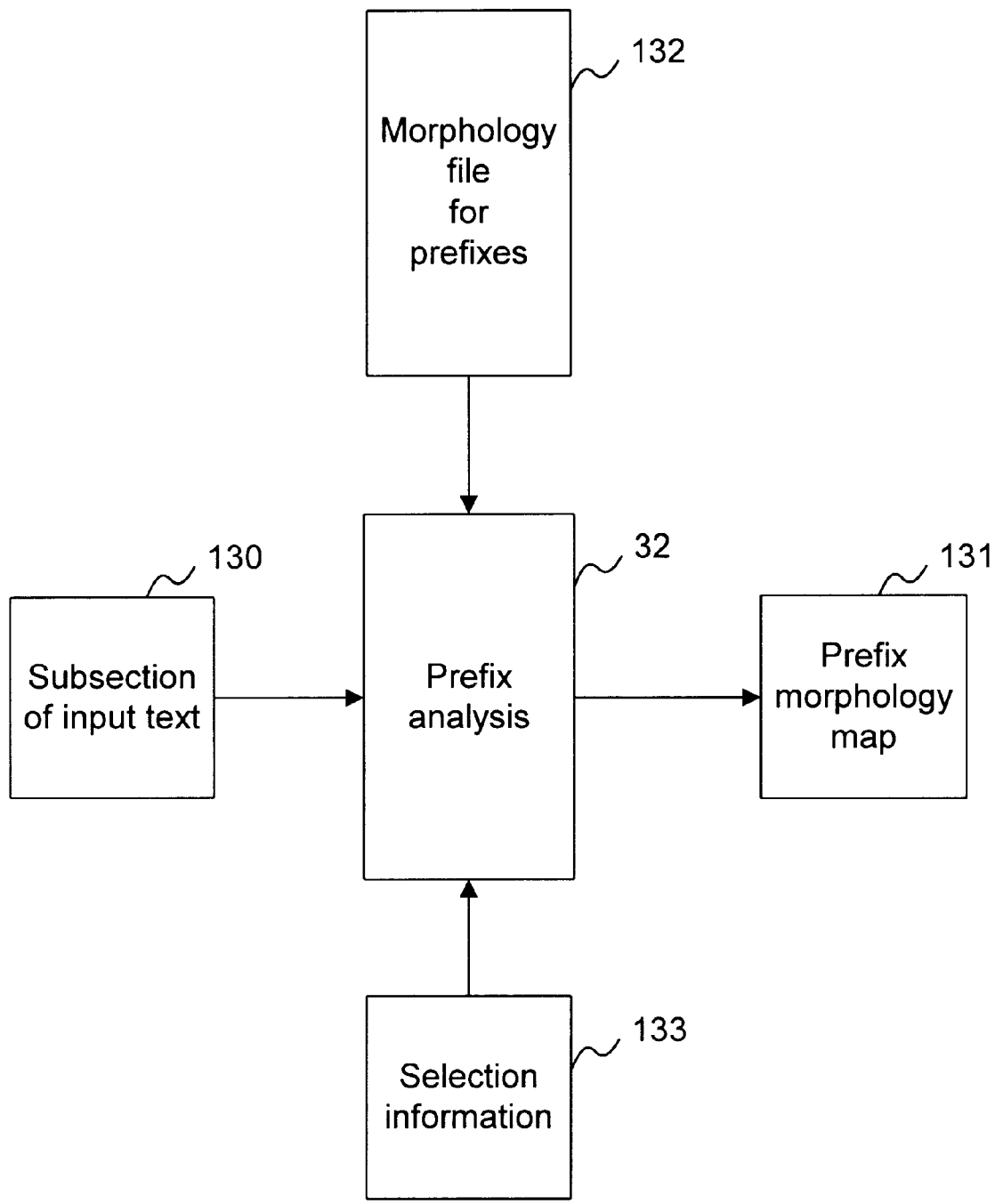
FIG. 18 depicts the data flow in prefix analysis.

After the conclusion of the identification of matching ophemes (step 112 in FIG. 16), prefix analysis 32 is applied to determine any bound prefix morphemes that are bound to the stems (step 111 in FIG. 16). An exception is made for zero-length (LNONE) MCats which have no matching ophemes nor primary lexicon entries. Prefix analysis is skipped for postfixes with zero-length (LNONE) MCats although SPB nodes are still created. As shown in FIG. 18, a subsection of input text 120 is processed to perform prefix analysis 32 using a morphology file for prefixes 132 that holds the morphemes. This results in a prefix morphological map 131 that holds all possible analyses for the subsection of input text. The prefix morphological map 131 is organized like the postfix morphological map but deals with analyses of prefix bound morphemes that attach to the left of the stem rather than postfix bound morphemes, which attach to the right of the stem. Selection information 133 is provided and incorporated into the prefix morphology map 131 in a manner like the incorporation of selection information into the postfix morphological map.

Figure 19:
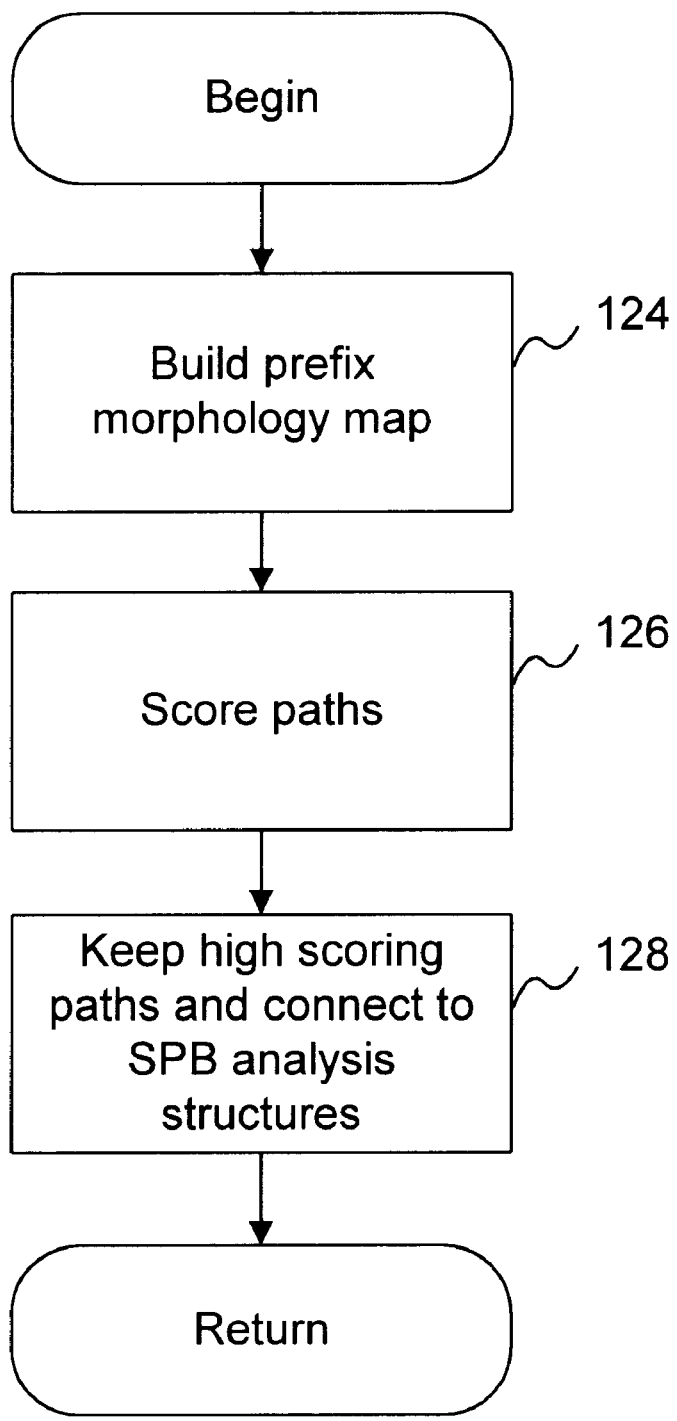
FIG. 19 is a flowchart illustrating the steps that are performed in prefix analysis.

FIG. 19 is a flowchart showing an overview of the steps performed by the prefix analysis 32. In particular, prefix morphological map 124 is built by identifying bound morphemes that are bound to possible stem analyses (step 124 in FIG. 19). The paths in the resulting prefix tree are scored using a scoring table (step 126 in FIG. 19). The highest scoring paths are then kept based on an empirically derived cutoff, and the prefix morphology map paths are connected to the respective soft phrase break analysis structures via field 124 of the SPB analysis 123 (step 128 in FIG. 19).

As mentioned above, the prefix tree is built using the morphemes in the prefix morphology file 132. The matching begins at the first character to the left of the given stem analysis. The surface representations of the morphemes are matched to the characters that lie to the left of the stem to identify matching morphemes. This process continues until all analyses for the given stem analysis are exhausted. Prefix analyses are rarely deeper than one morpheme.

The above described steps are repeated until the subsection has been completely analyzed.

Figure 20:
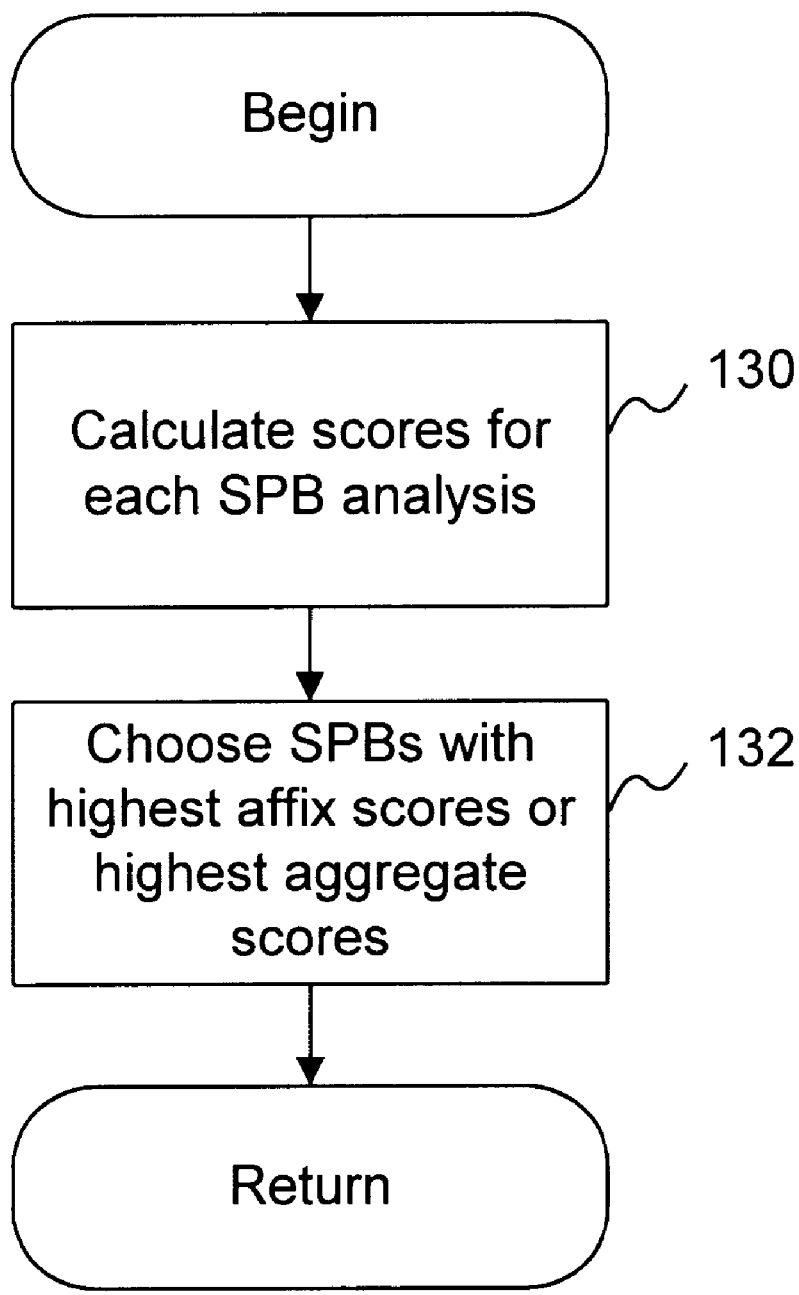
FIG. 20 is a flowchart illustrating steps that are performed to choose an optimal analysis of a phrase in accordance with a preferred embodiment of the present invention.

The word breaking facility 22 has, at this point, developed all the structures it needs to choose the best analysis of the jiritsugo phrase and separate output tokens 33 (step 44 in FIG. 3). The word breaking facility 22 must then choose the best SPB analysis. As shown in FIG. 20, the word breaking facility 22 calculates scores for the SPB analyses (step 130 in FIG. 20). These scores have already been adjusted as described above (step 43 in FIG. 3). The score for each analysis is the combination of the score for the postfix path and prefix path associated with the SPB analysis. The SPB analyses with the highest affix scores are chosen as the best analyses from which to continue analysis to the left. In the event that two SPB analyses have a same affix score, a tie is broken by choosing the SPB with the highest stem score (step 132 in FIG. 20). This analysis may be utilized to package output tokens 33 (FIG. 2)containing analysis information that are passed on to the application programs 20. The discussion below will consider three illustrative applications.

Steps 37–45 of FIG. 3 may be repeated if there are more phrases that remain to be processed in the section (see step 45) of input text. (Note the return arrow after the prefix analysis in FIG. 2.) In addition, steps 36–45 may be repeated on additional sections of input text if there are such additional sections that remain to be processed (see step 46 in FIG. 3). (Note the return arrow from box 31 in FIG. 2.)

Figure 21A:
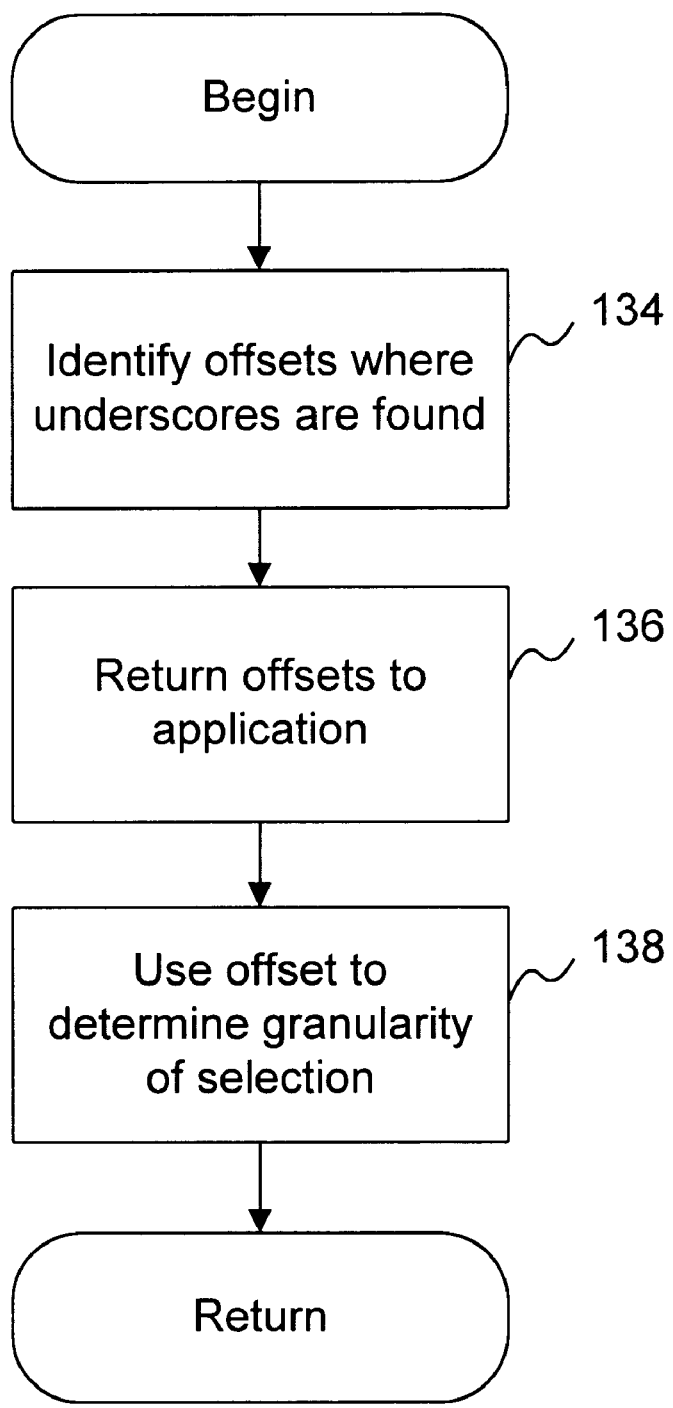
FIG. 21A is a flowchart illustrating the steps that are performed to use selection markers in an application program in the preferred embodiment of the present invention.

A first application concerns the granularity of selection of characters within the input text. In particular, as was discussed above, the underscored characters are included in the morphological map to specify selection boundaries. These selection boundaries may be used by an application program to determine granularity of selection. In general, the steps depicted in FIG. 21A are performed for this application. The offsets where the underscores are located within a portion of the input text are found (step 134 in FIG. 21A). These offsets are then returned to the application (step 136 in FIG. 21A). The application then uses these offsets to define selection boundaries (typically as points where selection is to begin and end). These boundaries help to determine the granularity of selection (step 138 in FIG. 21A).

A second application in which the word breaking provided by the preferred embodiment of the present invention may be utilized is in autosummarization. Autosummarization seeks to identify critical sentences or phrases of input text that adequately summarize the content of the text. The autosummarization may look for particular words, such as "in summary," that are good indicia of summarizing information being held in the sentence or phrase. For autosummarization, the application wishes to know where the stem in the phrase or sentences begins and where the postfix bound morphemes are located.

A third application is content indexing. The content indexing looks to identify the stems that are located within the sentence or phrases to obtain information about the content of the sentence or phrases and to index this content. Thus, offsets to the stem portion of the sentences or phrases are passed to the application in this instance.

Figure 21B:
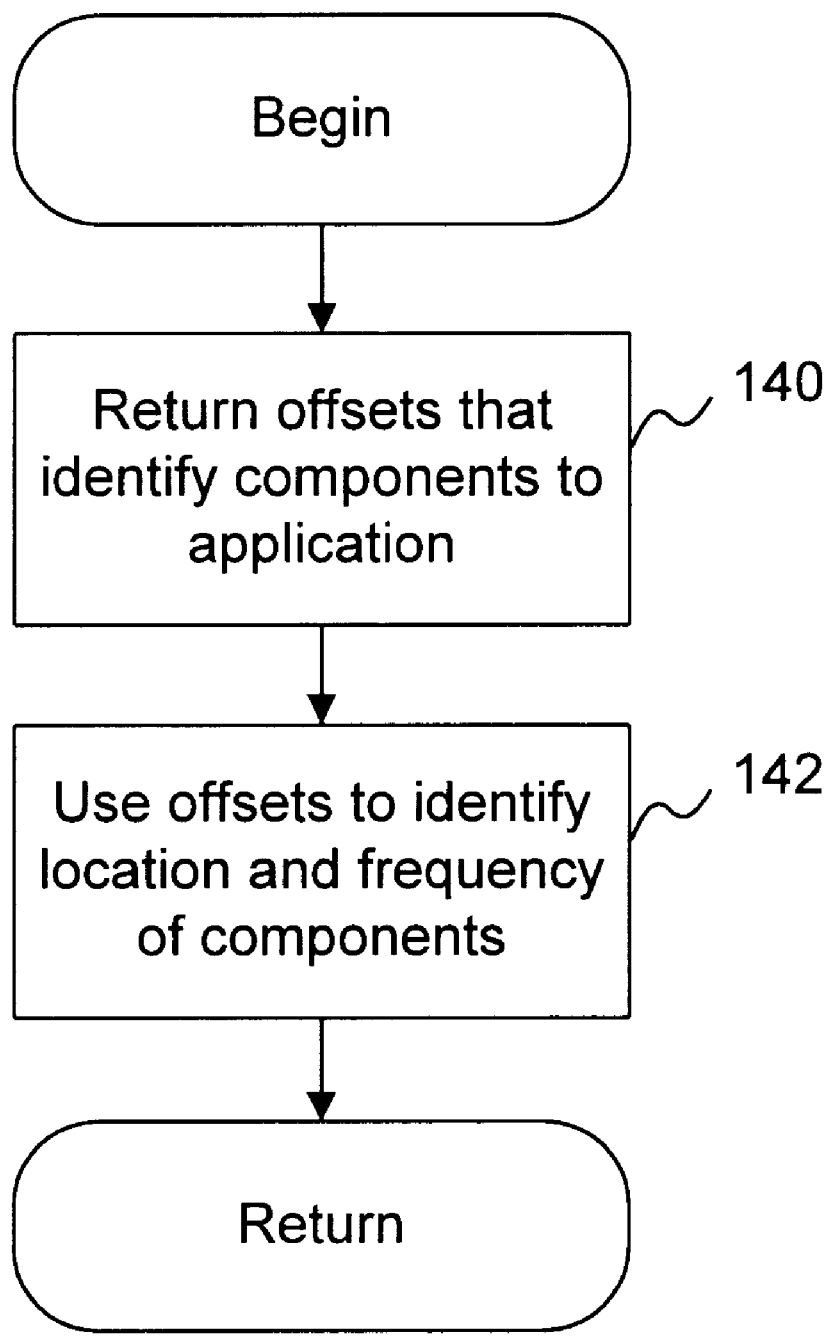
FIG. 21B is a flowchart illustrating the steps that are performed in second and third applications.

FIG. 21B has a flowchart that illustrates at high level the steps that are performed for the autosummarization content indexing applications. The word breaking facility 22 returns offsets that identify the desired components (i.e., stems or bound morphemes) to the application (step 14 in FIG. 21B). These offsets have been used to identify to the location of the component and to compile frequency information regarding the components (step 142 in FIG. 21B).

While the present invention has been described with reference to a preferred embodiment thereof, those skilled in the art will appreciate that various changes in form and detail may be made without departing from the intended scope of the present invention as defined in the appended claims. For example, the word breaking facility may be used in applications other than those described above, such as natural language processing applications that seek to provide syntactic analysis of sentences. Furthermore, this approach has applicability to natural languages other than Japanese.

We claim:

1. In a computer system, a method of processing, an input string of characters, comprising the computer-implemented steps of:
   identifying phrase breaks in the input string by applying a statistical technique, such that the phrase breaks delimit phrases;
   for each phrase within the input string,
     identifying possible postfix bound morphemes and creating a graphical representation of such morphemes;
     identifying possible stems in the phrase by comparing characters in the input string with stem character templates that each identify a pattern of character types in a stem;
     identifying possible prefix bound morphemes for each possible stem and creating a graphical representation of the prefix bound morphemes; and
     choosing a best combination of the possible postfix bound morphemes, stems and prefix bound morphemes as an analysis of the phrase in the input string that best characterizes the input string.

2. The method of claim 1 wherein the input string includes Japanese characters.

3. The method of claim 1 wherein the statistical technique used in identifying phrase breaks relies upon probabilities of breaking unigrams and breaking bigrams.

4. The method of claim 1 wherein the identifying of possible stems relies on probabilities of the stem character templates occurring.

5. In a computer system, a computer-readable storage medium holding instructions for:
   identifying phrase breaks in the input string by applying a statistical technique, such that the phrase breaks delimit phrases;
   for each phrase within the input string,
     identifying possible postfix bound morphemes and creating a graphical representation of such morphemes;
     identifying possible stems in the phrase by comparing characters in the input string with stem character templates that each identify a pattern of character types in a stem;
     identifying possible prefix bound morphemes for each possible stem and creating a graphical representation of the prefix bound morphemes; and
     choosing a best combination of the possible postfix bound morphemes, stems and prefix bound morphemes as an analysis of the input string that best characterizes the input string.

6. The computer-readable storage medium of claim 5 wherein the statistical technique used in identifying phrase breaks relies upon probabilities of breaking unigrams and breaking bigrams.

7. The computer-readable storage medium of claim 5 wherein the identifying of possible stems relies on probabilities of the stem character templates occurring.

8. The computer-readable storage medium of claim 5 wherein the input string includes Japanese characters.

9. A computer system comprising:

a phrase break analysis component for identifying hard phrase breaks in a character input string;

an analyzer for analyzing the input string to identify possible stems and affixes in the input string;

a tree generator for generating a tree representing the possible stems and affixes identified by the analyzer, the generated tree being comprised of nodes including a root node and leaf nodes, each path in the tree from the root node to a leaf node representing an alternative analysis of the input string;

and a selector for using the generated tree to choose a stem and one or more affixes from among those that have been identified as a representation of at least a portion of the input string, and for identifying the combination of the chosen stem and affixes as a word.

10. The computer system of claim 9 wherein the input string includes primarily Japanese characters.

11. The computer system of claim 9 wherein the computer system lacks a fully specified dictionary, the computer system performing a method comprising the steps of:

providing an input string of characters, said characters lacking white space between characters; and processing the input string to identify words and stems and affixes in the words.

12. The computer system of claim 11 wherein the processing includes identifying postfix bound morphemes that are bound to the stem.

13. The computer system of claim 11 wherein the processing includes identifying prefix bound morphemes that are bound to the stems.

14. The computer system of claim 11, further comprising the step of using the identification of the words, stems and affixes in natural language processing.

15. The computer system of claim 11, further comprising the step of using the identification of the words, stems and affixes in content indexing of the input string.

16. The computer system of claim 11, further comprising the step of using the identification of the words, stem and affixes in an autosummarization application that seeks to produce a summary of the input string.

* * * * *

UNITED STATES PATENT AND TRADEMARK OFFICE
CERTIFICATE OF CORRECTION

PATENT NO. : 5,946,648
DATED : August 31, 1999
INVENTOR(S) : Patrick H. Halstead Jr. et al.

It is certified that error appears in the above-identified patent and that said Letters Patent is hereby corrected as shown below:

Column 6, line 61, the number "18" has been written in bold face although it is not a number meant to be shown in the drawings. It merely indicates how many analysis may be done.

Column 8, line 44, "intra-SPE" should be --intra-SPB--.

Column 9, line 20, "06/27/965" should be --"06/27/96"--.

Column 9, line 32, delete ","

Column 10, lines 54-61, there should be two commas (,,) in each phrase.

Column 11, lines 11 and 16, there should be two commas (,,) in there two examples.

Signed and Sealed this

Twenty-sixth Day of December, 2000

Attest:

Q. TODD DICKINSON

*Attesting Officer*   *Director of Patents and Trademarks*